US008421955B2

(12) United States Patent
Kubota et al.

(10) Patent No.: US 8,421,955 B2
(45) Date of Patent: Apr. 16, 2013

(54) LIQUID CRYSTAL DISPLAY DEVICE

(75) Inventors: Hidenao Kubota, Yokohama (JP);
Satoshi Ouchi, Kamakura (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 303 days.

(21) Appl. No.: 12/782,082

(22) Filed: May 18, 2010

(65) Prior Publication Data

US 2010/0296026 A1 Nov. 25, 2010

(30) Foreign Application Priority Data

May 22, 2009 (JP) .................................. 2009-124149
Jul. 27, 2009 (JP) .................................. 2009-174306

(51) Int. Cl.
*G02F 1/1335* (2006.01)
*G09F 13/04* (2006.01)

(52) U.S. Cl.
USPC ................ 349/62; 349/61; 349/56; 362/97.1; 362/97.2; 362/97.3

(58) Field of Classification Search .................... 349/56, 349/58, 61, 62, 66, 160; 362/97.1, 97.2, 362/97.3, 97.4
See application file for complete search history.

(56) References Cited

U.S. PATENT DOCUMENTS

| | | | |
|---|---|---|---|
| 6,241,358 B1 | 6/2001 | Higuchi et al. | |
| 7,311,431 B2 * | 12/2007 | Chew et al. | 362/613 |
| 7,616,271 B2 * | 11/2009 | Souk et al. | 349/65 |
| 7,764,334 B2 * | 7/2010 | Kitagawa et al. | 349/65 |
| 8,243,231 B2 * | 8/2012 | Hur et al. | 349/65 |
| 2006/0139952 A1 | 6/2006 | Inoue et al. | |
| 2006/0221638 A1 * | 10/2006 | Chew et al. | 362/613 |
| 2006/0245213 A1 | 11/2006 | Beil et al. | |
| 2007/0247871 A1 | 10/2007 | Yoo | |
| 2008/0117360 A1 * | 5/2008 | Cernasov | 349/65 |
| 2008/0205080 A1 * | 8/2008 | Erchak et al. | 362/613 |
| 2008/0231774 A1 * | 9/2008 | Tomita et al. | 349/66 |
| 2010/0296026 A1 * | 11/2010 | Kubota et al. | 349/62 |
| 2011/0012942 A1 * | 1/2011 | Kim et al. | 345/690 |

FOREIGN PATENT DOCUMENTS

| | | |
|---|---|---|
| JP | 11-288611 | 10/1999 |
| JP | 2001-093321 | 4/2001 |
| JP | 2002-075038 | 3/2002 |
| JP | 2006-522436 | 9/2006 |
| JP | 2006-267780 | 10/2006 |
| JP | 2007-293339 | 11/2007 |
| JP | 2008/147147 | 6/2008 |
| TW | 200745681 | 4/1996 |
| WO | WO 2004/038283 A1 | 5/2004 |
| WO | WO 2004/088372 A1 | 10/2004 |

* cited by examiner

*Primary Examiner* — Brian Healy
(74) *Attorney, Agent, or Firm* — Antonelli, Terry, Stout & Kraus, LLP.

(57) ABSTRACT

An LCD device using LEDs as light sources provided herein is capable of reducing the manufacturing cost and the power consumption by a reduction in the number of LEDs used. A backlight according to the present invention includes LEDs mounted on a wiring board and a light guide plate having a matrix array of light guide plate blocks assigned the LEDs. The number of LEDs assigned to the block located in a peripheral area is smaller than the number assigned to the block located around the center to reduce the number of LEDs used in the backlight. If a ratio of the brightness in a peripheral area of the screen to the brightness in a central area is 60% or higher, the human eye does not perceive non-uniform luminance. Thus, the manufacturing cost and the power consumption of the LCD device can be reduced.

18 Claims, 23 Drawing Sheets

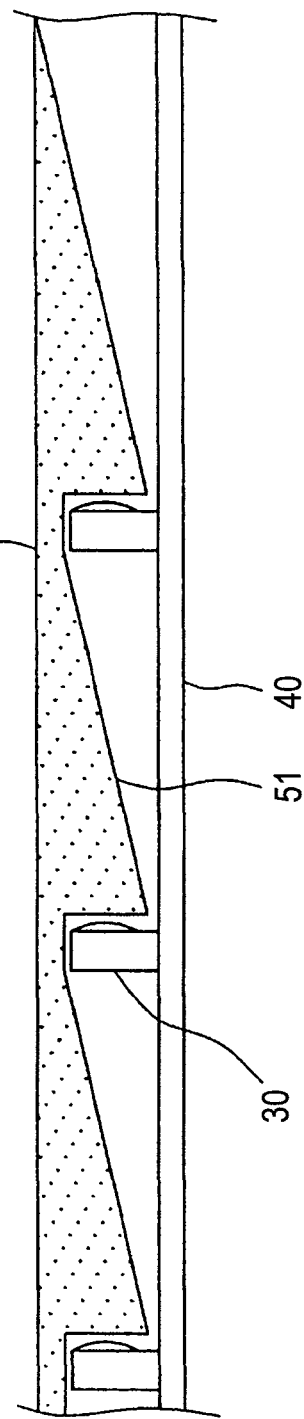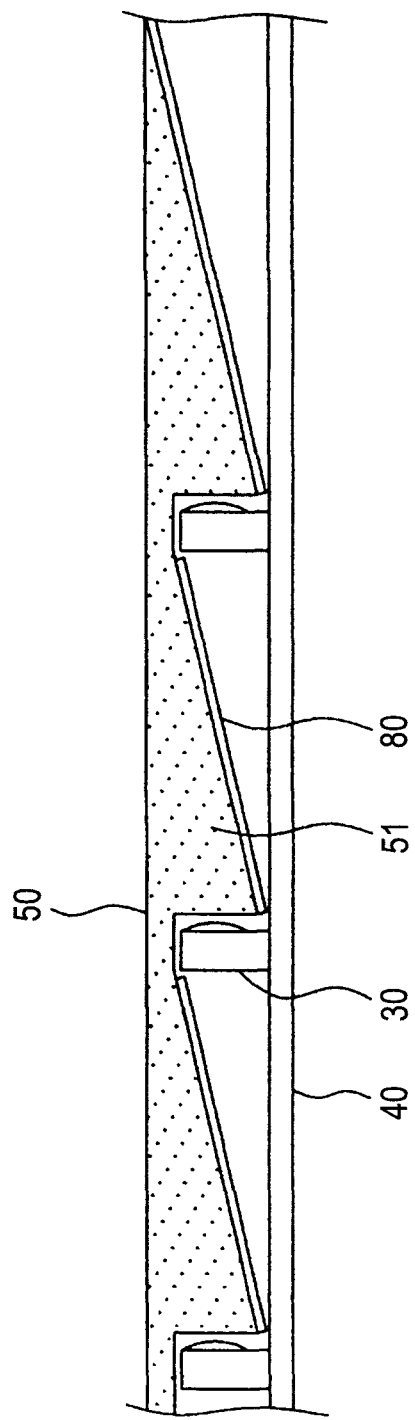

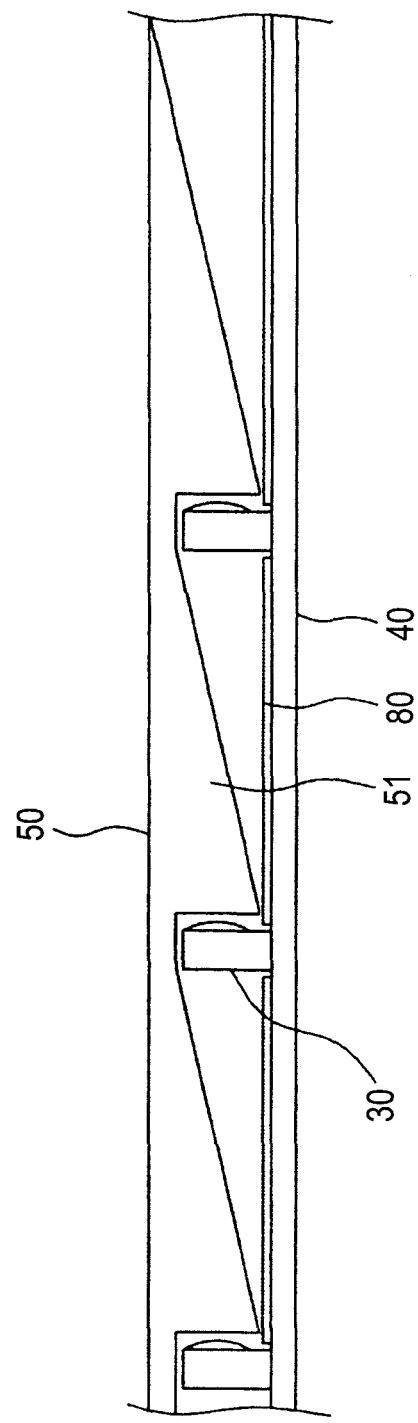

LIQUID CRYSTAL DISPLAY DEVICE

CLAIM OF PRIORITY

The present application claims priority from Japanese Patent Application JP 2009-124149 filed on May 22, 2009 and Japanese Patent Application JP 2009-174306 filed on Jul. 27, 2009, the content of which is hereby incorporated by references into this application.

BACKGROUND OF THE INVENTION

1. Field of the Invention

This invention relates to a liquid crystal display device using a LED backlight and, more particularly, to a relatively large size, thin liquid crystal display device with reduced power consumption used in a television set and the like.

2. Description of the Related Art

A liquid crystal display device includes a TFT substrate on which pixel electrodes, TFTs (Thin Film Transistors) and the like are arranged in a matrix form, an opposite substrate which faces the TFT substrate and on which color filters and the like are arranged corresponding to the pixel electrodes on the TFT substrate, and liquid crystal which is sandwiched between the TFT substrate and the opposite substrate. The liquid crystal display device controls the light transmittance through the liquid crystal molecules on a pixel-by-pixel basis to generate an image.

The liquid crystal display device is employed in various fields for the reason that it can provide a reduction in thickness and weight. Because the liquid crystal itself does not emit light, a backlight is placed on the rear surface of the liquid crystal display panel. A liquid crystal display device with a relatively large size screen such as a television set employs a fluorescent tube as a backlight. However, LEDs (Light Emitting Diodes) have been increasingly employed in response to requests for a further reduction in thickness of a liquid crystal display device, an increase in a color reproduction range, and the like.

The backlight is divided into two types according to the position of a light source, namely a direct-lit backlight having a light source disposed directly under the liquid crystal display panel and an edge-lit backlight having a light source disposed on a side edge of a light guide plate. In many cases, a liquid crystal display device with a relatively large size screen employs a direct-lit backlight with a light source disposed directly under the liquid crystal display panel, in order to increase the brightness of the screen.

A related-art CRT television set or the like delivers a uniform brightness of the screen. However, in a television set or the like using the liquid crystal display device, the brightness of the screen is not necessarily required to be uniform, and the luminance may be set smaller in a peripheral area of the screen than that in a central area. WO2004/038283 discloses a structure of a direct-lit backlight using a fluorescent tube as a light source in which the dot patterns are respectively printed at different dot densities between central and peripheral portions of the reflecting surface such that the brightness level of the central area of the screen is lower than that of the peripheral area of the screen. WO2004/038283 also describes a structure of a direct-lit backlight using LEDs as light sources in which the density of the LEDs is varied depending on location in order to adjust the brightness of the screen.

JP-A No. 2002-75038 describes a structure of a relatively small size liquid crystal display device using an edge-lit backlight in which LEDs are arranged on a side edge of a light guide plate such that the LED density is varied between portions close to the center and close to an end of the side edge in order to adjust the luminance of the screen.

JP-A No. 2001-93321 describes a structure of a light guide plate of an edge-lit backlight in which plural light guide plates are seamlessly arranged in a first direction. The light guide plate described in JP-A No. 2001-93321 is a single light guide plate extending in a second direction perpendicular to the first direction.

SUMMARY OF THE INVENTION

In a direct-lit backlight, the brightness of the screen can be easily increased, but the thickness of the liquid crystal display device cannot be easily decreased. FIG. 39 is a schematic cross-section view of a liquid crystal display device including a direct-lit backlight using LEDs as light sources. LEDs 30 are disposed on a back cover 90. A direct-lit backlight uses a diffuser plate, diffuser sheets or the like which are omitted in FIG. 39.

In FIG. 39, the distance d from the bottom of the LED 30 to the underside of the liquid crystal display panel is required to range from about 25 mm to about 35 mm. In FIG. 39, if the distance d between the liquid crystal display panel 10 and the LED 30 is decreased while the pitch P between the LEDs 30 remains constant, luminance nonuniformity occurs. For a decrease in the distance d without the occurrence of luminance nonuniformity, a decrease in the pitch P between the LEDs 30 is required. However, to decrease the pitch P between the LEDs 30 requires a larger number of LEDs 30, implying manufacturing-cost disadvantages.

FIG. 40 is a schematic cross-section view of a liquid crystal display device with an edge-lit backlight. In FIG. 40, a light guide plate 50 is situated on a back cover 90. LEDs 30 are disposed on an edge face of the light guide plate 50. The light emitted from the LED 30 is directed toward the liquid crystal display panel 10 by the light guide plate 50. Diffuser sheets and the like are in fact provided between the liquid crystal display panel 10 and the light guide plate 50, but they are omitted in FIG. 40.

In FIG. 40, the distance d from the underside of the light guide plate 50 to the underside of the liquid crystal display panel 10 is in a range from 10 mm to 15 mm, which can be set smaller than the distance in the direct-lit backlight. However, since the light of the LED 30 enters from the edge of the light guide plate 50, the light-use efficiency is low as compared with that in the direct-lit backlight. An edge-lit backlight as illustrated in FIG. 40 needs to be equipped with a larger number of LEDs 30 than that in the direct-lit backlight in order to offer a screen brightness level equal to that in the direct-lit backlight.

For example, in a 42-inch screen liquid crystal display device, the direct-lit backlight needs to include 500 LEDs 30 to offer a predetermined brightness level. On the other hand, the edge-lit backlight needs to include 700 LEDs 30 to offer the brightness level equal to the brightness level by the direct-lit backlight. That is, although the use of the edge-lit backlight enables a reduction in thickness of the liquid crystal display device, an increased number of LEDs 30 is required, leading to an increase of the power consumption of the LEDs 30.

The present invention has been made in view of the above circumstances and provides a liquid crystal display device which is reduced in thickness without an increase in the number of LEDs and also an increase in power consumption as compared with the use of a direct-lit backlight.

Accordingly, a liquid crystal display device according to one aspect of the present invention includes a liquid crystal display panel and a backlight. The backlight includes a rectangular light guide plate that includes rectangular light guide plate blocks each arranged in a matrix form, and light sources arranged corresponding to the light guide plate blocks. Each of the light guide plate blocks receives light emitted from a corresponding light source of the light sources, and redirects the light toward the liquid crystal display panel. An intensity of light exiting a light guide plate block of the light guide plate blocks located in a central area of the light guide plate is higher than an intensity of light exiting a light guide plate block of the light guide plate blocks located in a peripheral area of the light guide plate.

More specifically, a liquid crystal display device according to another aspect of the present invention includes a liquid crystal display panel and a backlight. The backlight includes a rectangular light guide plate that includes rectangular light guide plate blocks each arranged in a matrix form, and LEDs arranged corresponding to the light guide plate blocks. The number of LEDs assigned to light guide plate blocks of the light guide plate blocks located in a central area of the light guide plate is greater than the number of LEDs assigned to light guide plate blocks of the light guide plate blocks located in a peripheral area of the light guide plate.

A liquid crystal display device according to another aspect of the present invention includes a liquid crystal display panel and a backlight. The backlight includes a rectangular light guide plate that includes rectangular light guide plate blocks each arranged in a matrix form, and LEDs arranged corresponding to the light guide plate blocks. Each of light guide blocks of the light guide plate blocks located in an end area of the light guide plate has a size greater than a size of each of light guide plate blocks of the light guide plate blocks located in a central area of the light guide plate.

According to the present invention, since a light guide plate has light guide plate blocks arranged in matrix form and the number of LEDs assigned to the light guide plate block located in a peripheral area is smaller than the number of LEDs assigned to the light guide plate block located in a central area, a reduction in the number of LEDs used in the backlight and a reduction in the power consumption of the backlight are made possible without causing the human eye to perceive reduced luminance.

According to the present invention, since the light guide plate is made up of light guide plate blocks arranged in a matrix form, a reduction in the thickness of a backlight is made possible. In addition, according to the present invention, since the light guide plate is made up of light guide plate blocks arranged in a matrix form, area control for brightness can be implemented.

According to the present invention, by use of the light guide plate having light guide plate blocks arranged in a matrix form, the light guide plate block located in the peripheral area is increased in size to reduce the total number of light guide plate block. As a result, the total number of LEDs used in the backlight can be reduced. Thus, a reduction in the total number of LEDs leads to a reduction in the poser consumption of the liquid crystal display device.

According to the present invention, since there is no need to actively change the number of LEDs for each light guide plate block, the area control for brightness is facilitated. The implementation of the area control for brightness leads to a reduction in the poser consumption of the liquid crystal display device. In addition, according to the present invention, since the light guide plate is made up of light guide plate blocks arranged in a matrix form, a thinner backlight can be achieved.

BRIEF DESCRIPTION OF THE DRAWINGS

Embodiments of the present invention will be described in detail with reference to the following drawings, wherein:

FIG. 14 is a cross-section view illustrating the relationship between the light guide plate and the LEDs according to exemplary embodiment 2;

FIG. 15 is a cross-section view illustrating an example of the relationship between the light guide plate and a reflective sheet;

FIG. 16 is a cross-section view illustrating the location of a reflective sheet according to exemplary embodiment 3;

DETAILED DESCRIPTION OF THE EMBODIMENT

Embodiments according to the present invention will be described below in detail with reference to the accompanying drawings.

The embodiments describe a liquid crystal display device which has a backlight including a rectangular light guide plate having rectangular light guide plate blocks arranged in a matrix form and light sources arranged appropriately for each light guide plate block, in which the intensity of the light emitted from a light guide plate block located at the center of the light guide plate is set stronger than the intensity of the light emitted from a light guide plate block located in a peripheral area of the light guide plate. In other words, the intensity of the light emitted from a light guide plate block located in a peripheral area of the light guide plate is set weaker than the intensity of the light emitted from a light guide plate block located at the center of the light guide plate. Thus, a reduction in power consumption of the backlight is achieved. The intensity of the light from the light guide plate block described here refers to, for example, an average light intensity over the light emission surface of the light guide plate block.

In the embodiment, the difference between the light intensities from the light guide plate blocks which are located in a peripheral area and a central area as described above is achieved by the following two structures. Specifically, (1) the number of LEDs assigned to a center light guide plate block of the light guide plate is set greater than the number of LEDs assigned to a peripheral light guide plate block of the light guide plate. (2) The size (area) of a central light guide plate block of the light guide plate is determined to be greater than that of a peripheral light guide plate block of the light guide plate. The structure (1) will be described in detail in the following exemplary embodiments 1 to 3 and the structure (2) will be described in detail in exemplary embodiments 4 to 8.

Exemplary Embodiment 1

Figure 1:
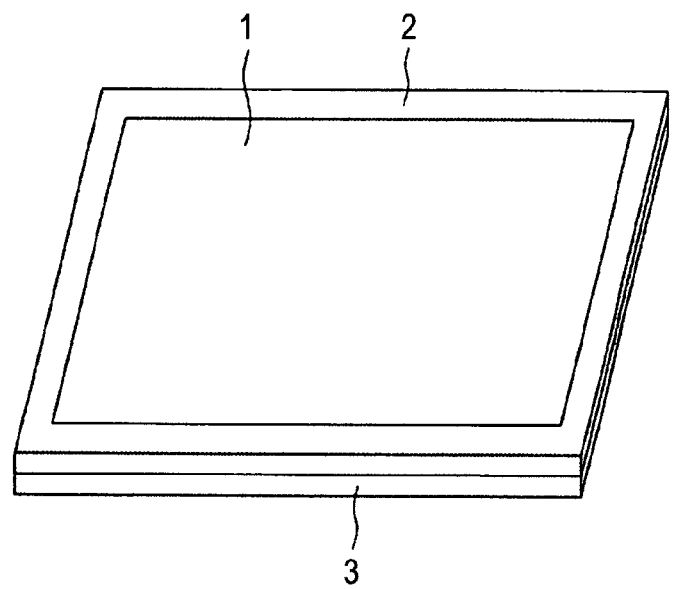
FIG. 1 is a schematic overview diagram of a liquid crystal display device.

FIG. 1 shows an example when a liquid crystal display (hereinafter referred to as "LCD") device according to the embodiment of the present invention is employed in a liquid crystal TV. In FIG. 1, a display frame 2 surrounds the periphery of an LCD panel except for a display screen 1. A backlight 3 is mounted on the rear surface of the LCD panel. The backlight 3 shown in FIG. 1 includes a light guide plate made up of plural light guide plate blocks and LEDs assigned to each of the light guide plate blocks.

Figure 2:
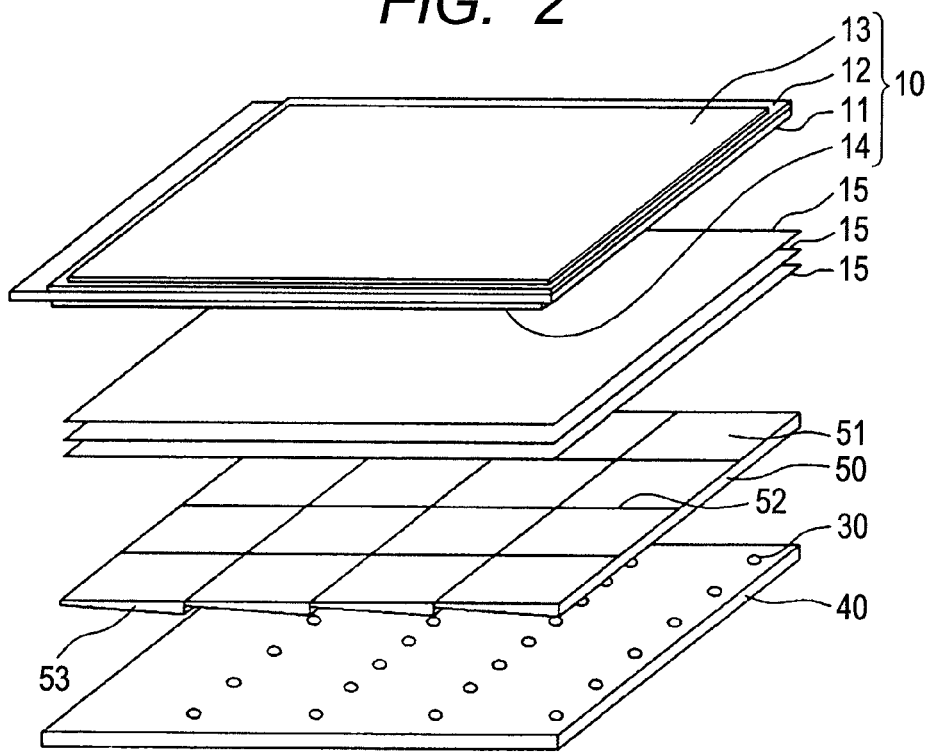
FIG. 2 is an exploded perspective view illustrating exemplary embodiment 1 according to the present invention.

FIG. 2 is an exploded perspective view of an LCD panel 10 and a backlight without the display frame and the like in the LCD device shown in FIG. 1. In FIG. 2, a TFT substrate 11 and an opposite substrate 12 on which color filters and the like are formed are bonded together with an adhesive not shown. On the TFT substrate, a display area with matrixes of TFTs and pixel electrodes formed therein is defined and scan lines, video signal lines and the like are formed. Liquid crystal (not shown) is sandwiched between the TFT substrate 11 and the opposite substrate 12.

In FIG. 2, a lower polarizer plate 14 is attached to the underside of the TFT substrate 11 and an upper polarizer plate 13 is attached to the topside of the opposite substrate 12. An LCD panel 10 refers to one having the TFT substrate 11, the opposite substrate 12, the lower polarizer plate 14 and the upper polarizer plate 13 bonded together. A backlight is disposed on the rear surface of the LCD panel 10. The backlight includes a light source unit and various optical components.

In FIG. 2, the light source unit has LEDs 30 arranged on a wiring board 40. The LEDs 30 are arranged at different densities on a portion close to the center and a portion close to the perimeter of the wiring board 40. This is because the luminance is intentionally reduced in the peripheral portion of the display screen. A light guide plate 50 having guide light plate blocks 51 is disposed on the wiring board 40 with the LEDs 30 arranged thereon. The LEDs 30 are arranged on the wiring board 40 in correspondence to the light guide plate blocks 51.

Figure 3A:
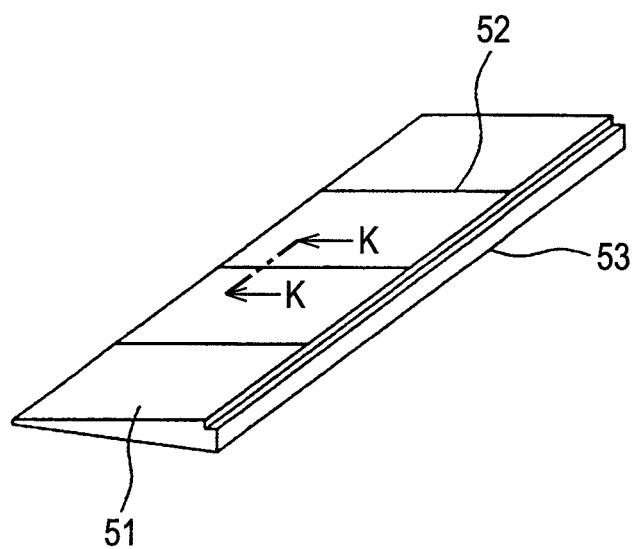
FIGS. 3A and 3B are a perspective view and a diagram illustrating a divided light guide plate.
Figure 3B:
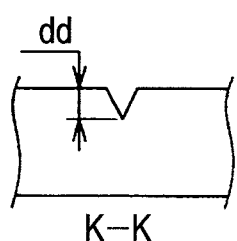

The light guide plate 50 shown in FIG. 2 is made up of four rectangular divided light guide plates 53. FIGS. 3A and 3B illustrate the shape of a divided light guide plate 53. FIG. 3A is a perspective view of the divided light guide plate 53. The divided light guide plate 53 is made up of four light guide plate blocks 51. FIG. 3B is a cross section view taken along the line K-K in FIG. 3A, which shows a cross-section shape of a groove 52 which is formed in the divided light guide plate 53 to form a boundary between adjacent light guide plate blocks 51. Each of the light guide plate blocks 51 is defined by the grooves 52. Because of the grooves 52, each of the light guide plate blocks 51 functions as an independent light guide plate. As shown in FIG. 3B, the groove 52 is formed in an approximate V shape having a depth dd of approximately 0.5 mm.

Returning to FIG. 2, three diffuser sheets 15 are disposed on the light guide plate 50. Because each of the diffuser sheets 15 has a thickness of approximately 60 μm, the three diffuser sheets 15 are placed on the light guide plate 50 in actual fact. Microscopic asperities are formed on the surface of the diffuser sheet 15 to diffuse the light from the light guide plate 50. The microscopic asperities on the surface play a role as a form of a prism and serve to change the direction of the light entering the diffuser sheets 15 at a diagonal angle to a direction toward the LCD panel 10.

The use of the three diffuser sheets 15 is one example, and the number of diffuser sheets used may be one or two, or alternatively more than three, as necessary. If necessary, a prism sheet may be arranged in addition to the diffuser sheets 15. A prism sheet serves to redirect the light entering at a diagonal angle from the backlight toward the LCD panel 10 to improve the screen luminance.

The LCD panel 10 is located on the uppermost diffuser sheet 15. After the assembling process, an interval of, for example, approximate 50 μm is kept between the LCD panel 10 and the diffusion sheet 15. Such an interval is provided for preventing the diffusion sheet 15 and the lower polarizer sheet 14 from rubbing against each other to damage each other.

Figure 4:
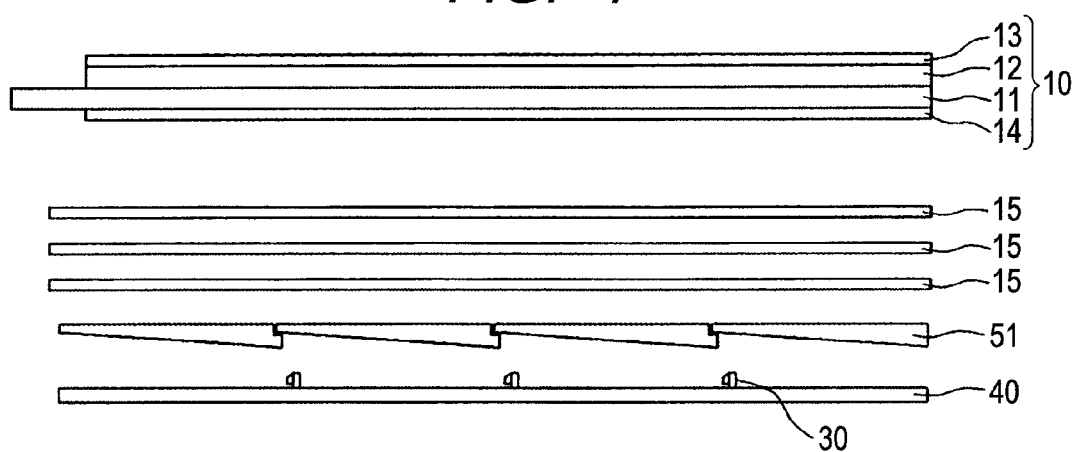
FIG. 4 is an exploded perspective view illustrating exemplary embodiment 1.

FIG. 4 is an exploded cross-section view of the LCD device shown in FIG. 2. In FIG. 4, the LCD panel 10 and the three diffuser sheets 15 are provided as described in FIG. 2. In FIG. 4, the light guide plate 50 is located under the diffuser sheets 15. The light guide plate 50 is made up of four divided light guide plates 53. As described in FIGS. 3A and 3B, each of the divided light guide plates 53 includes four light guide plate blocks 51.

Each of the divided light guide plates 53 is formed in a wedge shape in cross-section, which has a thick end of approximate 3 mm in thickness and a thin end of 1 mm or less in thickness. The thin end of the divided light guide plate 53 is fitted into a stepped stage formed in the thick end of a divided light guide plate 53 located at the front of the divided light guide plate 53, so that the outline of the divided light guide plates 53 appears as a single light guide plate 50.

In FIG. 4, the light guide plate 50 is placed on a wiring board 40 having LEDs 30. The LEDs 30 are placed along the face of the thick end in a cross section of each divided light guide plate 53. The light emitted from the LED 30 enters the light guide plate 50 through the face of the thick end, and then exits after being redirected within the light guide plate 50 toward the LCD panel 10.

Figure 5:
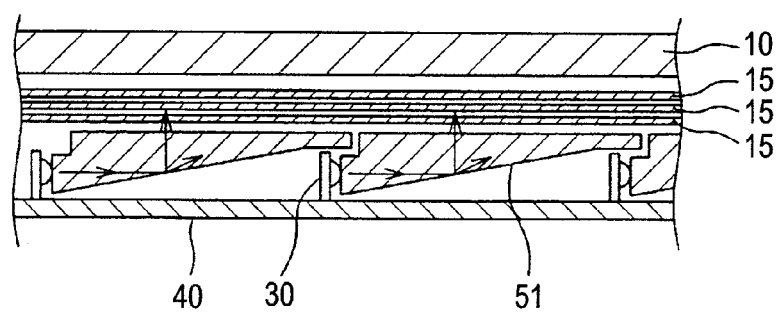
FIG. 5 is a detail cross-section view illustrating exemplary embodiment 1.

FIG. 5 is a cross-section view of the assembly of the components shown in FIG. 4. FIG. 5 illustrates a cross-section of one light guide plate block 51 of the divided light guide plate 53. In FIG. 5, a LED 30 on the wiring board 40 is placed corresponding to the face of the thick end of the light guide plate block 51. A combination of LEDs 30 is determined with respect to each divided light guide plate 53. The combination is not required to be determined with respect to each LED 30 or each light guide plate block 51.

In FIG. 5, the light incident from a LED 30 through the side face into the light guide plate block 51 reflects off, for example, the bottom surface of the light guide plate block 51 to be redirected toward the LCD panel 10. However, since the bottom surface of the light guide plate block 51 is formed as a diffusing surface, the light incident from the LED 30 travels in many directions, but much of the reflected light travels toward the LCD panel 10.

The light guide plate block 51 is required to have a bottom surface inclined at a predetermined angle for efficiently redirecting the light emitted from the LED 30 toward the LCD panel 10. Accordingly, as the light guide plate 50 is larger in size, the light guide plate 50 has a thicker end along which the LEDs 30 are arranged. Since the light guide plate 50 is divided, the present invention can reduce the thickness of the thick end of the light guide plate 50.

Figure 6A:
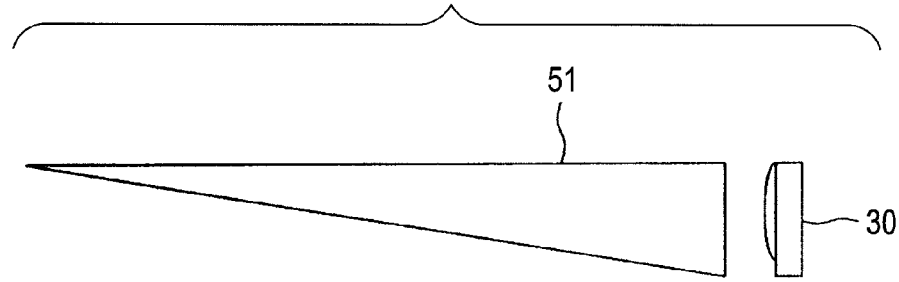
FIGS. 6A and 6B are schematic diagrams illustrating the relationship between a light guide plate block and LEDs.
Figure 6B:
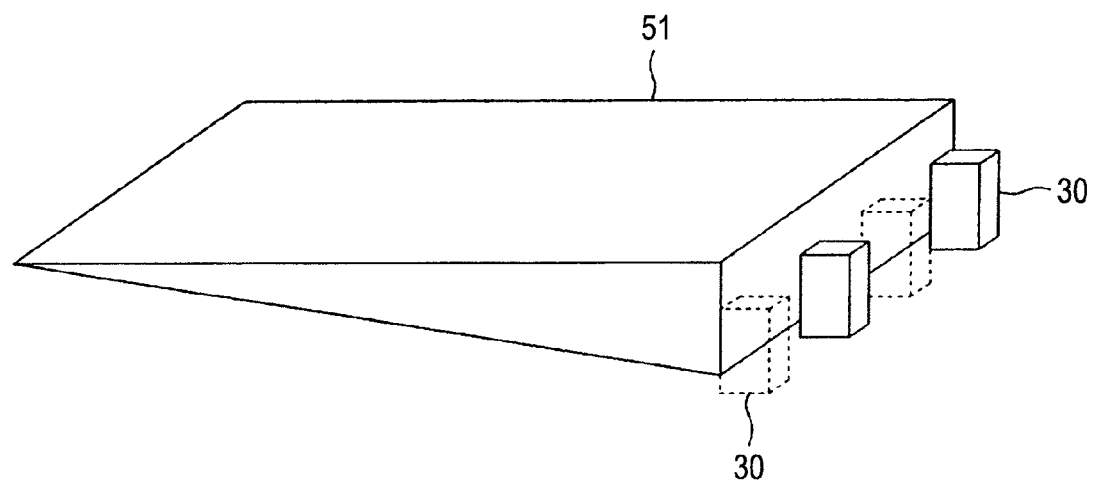

FIGS. 6A and 6B are a schematic cross-section view and a perspective view showing the relationship between the light guide plate block 51 and the LEDs 30. FIG. 6A shows a cross-section of the light guide plate block 51 in a simplified triangle shape. The LEDs 30 are arranged along the face of the thick end of the light guide plate block 51. For convenience of understanding, FIG. 6A shows the LED 30 separated from the end face of the light guide plate block 51. In actual fact, however, the LED 30 is placed as close as possible to the end face of the light guide plate block 51 for an increase in use efficiency of the light emitted from the LED 30.

In FIG. 6B, two LEDs 30 represented by the solid line and two LEDs 30 represented by the dotted line are arranged along the end face of the light guide plate block 51. In the present invention, the number of LEDs 30 assigned to a light guide plate block 51 is changed on a block-by-block basis in order to ramp the screen luminance to a degree without an image looking unnatural by human visual sense, resulting in a reduction in the number LEDs 30 used in the entire LCD device.

For example, the light guide plate block 51 located around the center of the screen is assigned four LEDs 30, and the light guide plate block 51 located in a peripheral area of the screen is assigned, for example, the two LEDs 30 represented by the solid line without the two LEDs 30 represented by the dotted line. The number of LEDs 30 is determined in accordance with the size of the screen, the size of light guide plate block 51 and an intended luminance ramp for the screen.

In a related art CRT TV, the luminance is also changed in a central area of the screen and a peripheral area of the screen. In the case of a TV set employing the LCD panel 10, studies of the relationship between screen luminance and human visual sense show that non-uniform luminance is not visually perceived when a ratio of the brightness in a peripheral area of the screen to the brightness in a central area of the screen is approximate 60%.

Figure 7:
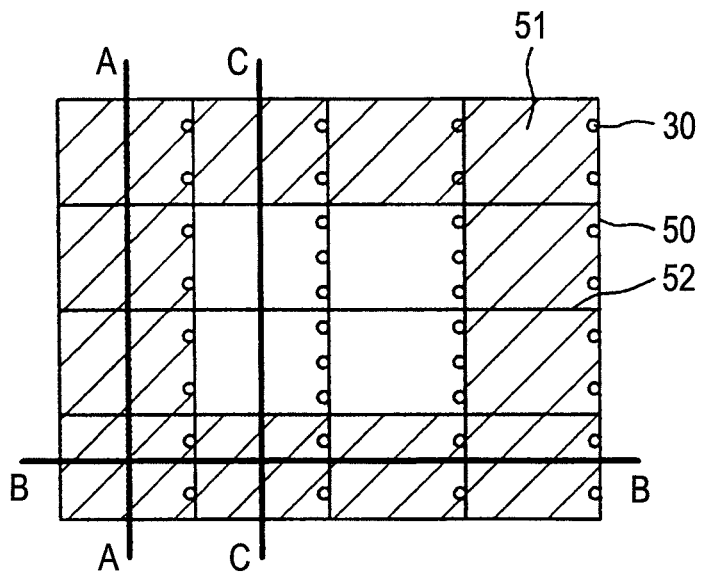
FIG. 7 is a plan view illustrating a first example of the relationship between positions of the light guide plate blocks and the number of LEDs.
Figure 8:
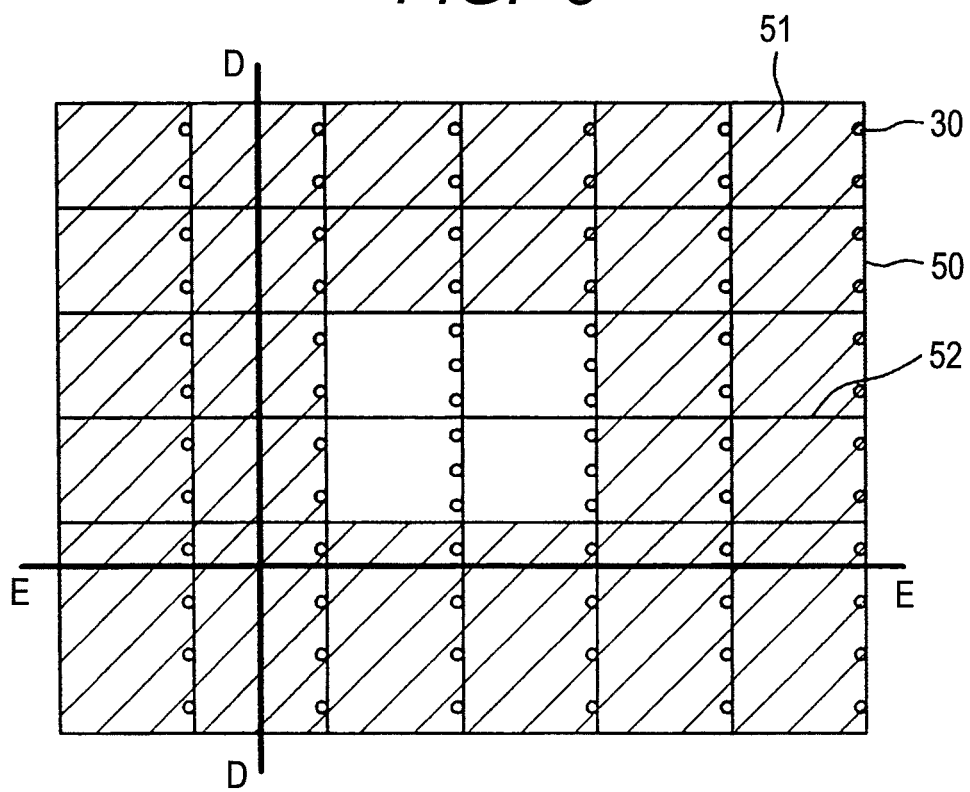
FIG. 8 is a plan view illustrating a second example of the relationship between positions of the light guide plate blocks and the number of LEDs.
Figure 9:
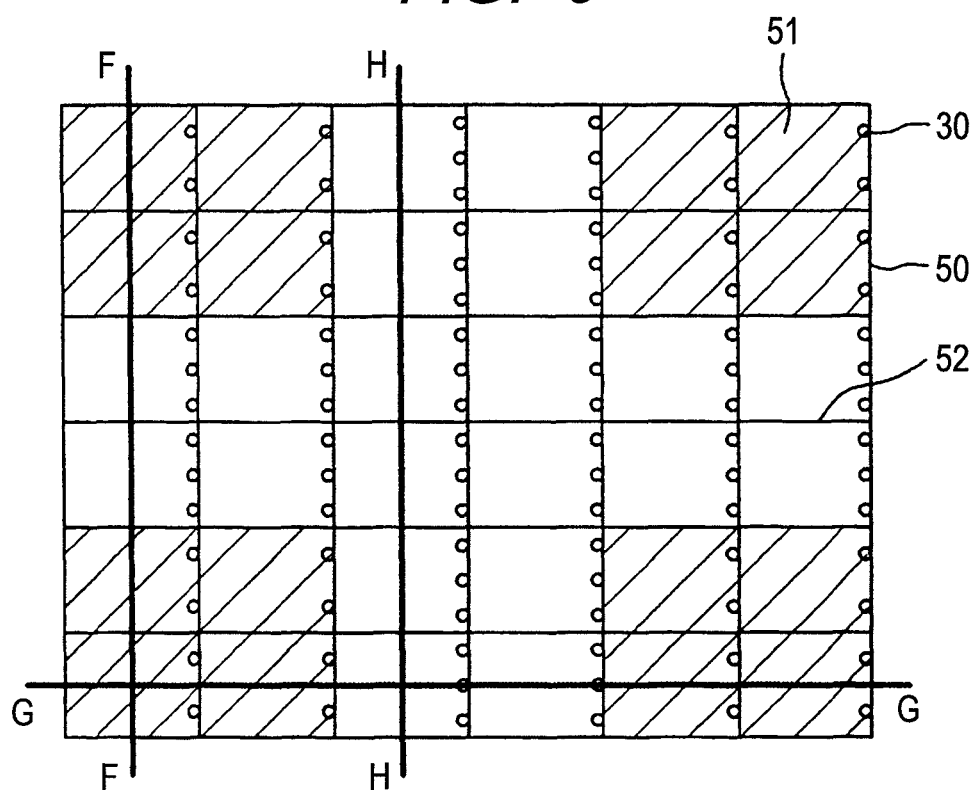
FIG. 9 is a plan view illustrating a third example of the relationship between positions of the light guide plate blocks and the number of LEDs.

FIGS. 7 to 9 show examples of the number of LEDs 30 assigned to each light guide plate block 51. In the example of FIG. 7 the light guide plate 50 is divided into 16. In FIG. 7 a vertical line represents the boundary between the divided light guide plates 53 and a horizontal line represents the groove 52 between the light guide plate blocks 51. In FIG. 7, the light guide plate blocks 51 located in the peripheral area are each assigned two LEDs 30, while the four light guide plate blocks 51 located in the central area are each assigned three LEDs 30.

The diagonally shaded area in FIG. 7 is the area in which each light guide plate block 51 is assigned the two LEDs 30. The luminance in this area is lower than that in the central area. It appears that a difference of brightness is caused on the boundary between the light guide plate block 51 assigned the three LEDs 30 and the light guide plate block 51 assigned the two LEDs 30 in FIG. 7. In actual fact, however, since light leakage occurs between the light guide plate blocks 51 as described later, a difference of brightness is not caused.

In FIG. 7, any light guide plate block 51 corresponding to the A-A line is assigned the two LEDs 30, and likewise any light guide plate block 51 corresponding to the B-B line is assigned the two LEDs 30. Of the light guide plate blocks 51 corresponding to the C-C line in FIG. 7, the light guide plate blocks 51 located at the opposite ends are each assigned the two LEDs 30 and the central light guide plate blocks 51 are each assigned the three LEDs 30.

In other words, the same number of LEDs 30 are assigned to each of the light guide plate blocks 51 which are arranged along the short sides and the long sides of the light guide plate 50 (that is, which include the upper, lower, right and left side edges of the light guide plate 50). On the other hand, for each of the light guide plate blocks 51 which are arranged along the long axis or the short axis passing through the center of the light guide plate 50, the number of LEDs 30 assigned is greater in a central area on the long axis or the short axis than that in an edge area on the long axis or the short axis. The light guide plate blocks 51 arranged along the long axis or the short axis of the light guide plate 50 described here include the light guide plate blocks 51 arranged on both sides of the long axis or the short axis.

Although placement of the LEDs 30 as shown in FIG. 7 results in a reduction in luminance in the peripheral area of the screen, the luminance in the peripheral area of the screen has little effect on human visual sense if the luminance in the central area of the screen is equal to or higher than 60%. On the other hand, a reduction in the number of LEDs 30 assigned to the peripherally located light guide plate blocks 51 enables a reduction in component cost of the LED 30 as well as a reduction in power consumption of the backlight.

FIG. 8 shows an example of the light guide plate 50 divided into 36 for a TV set with a screen larger than that in FIG. 7. In FIG. 8, a vertical line represents the boundary between the divided light guide plates 53 and a horizontal line represents the groove 52 between the light guide plate blocks 51. In FIG. 8, two LEDs 30 are assigned to each of the outermost light guide plate blocks 51 which are arranged along the periphery and of the light guide plate blocks 51 which are adjacent to the outermost light guide plate blocks 51 on the inward side. On the other hand, three LEDs 30 are assigned to each of the four light guide plate blocks 51 located in the central area.

The diagonally shaded area in FIG. 8 is the area in which each light guide plate block 51 is assigned the two LEDs 30. The luminance in this area is lower than that in the central area. In FIG. 8, there is a negligible difference in brightness between the peripheral area of the screen represented by the diagonally shaded area and the central area of the screen, as described later.

In FIG. 8, any light guide plate block 51 corresponding to the D-D line is assigned the two LEDs 30, and likewise any light guide plate block 51 corresponding to the E-E line is assigned the two LEDs 30.

A reduction in the number of LEDs 30 assigned to the peripherally located light guide plate blocks 51 enables a reduction in component cost of the LED 30 as well as a reduction in power consumption of the backlight. Since the example described in FIG. 8 employs a large screen, the reduction in the number of LEDs 30 produces a greater reduction in cost and a grater reduction in power consumption as compared with the example described in FIG. 7.

FIG. 9 shows an example in which the light guide plate 50 is used for a TV set with the same screen size as that in FIG. 8 and the distribution of brightness on the screen is different from that in FIG. 8. The light guide plate 50 in FIG. 9 is divided into 36. In FIG. 9, a vertical line represents the boundary between the divided light guide plates 53 and a horizontal line represents the groove 52 between the light guide plate blocks 51. In FIG. 9, two LEDs 30 are assigned to each of the four light guide plate blocks 51 which are located in the four corners of the light guide plate 50. Three LEDs 30 are assigned to each of the light guide plate blocks 51 which are located around the center, the long axis and the short axis.

The diagonally shaded area in FIG. 9 is the area in which each light guide plate block 51 is assigned the two LEDs 30. The luminance in this area is lower than that in the central area. In FIG. 9, there is a negligible difference in brightness between the peripheral area of the screen represented by the diagonally shaded area and the central area of the screen, as described later.

In FIG. 9, regarding the light guide plate blocks 51 corresponding to each of the F-F and G-G lines, each of the light guide plate blocks 51 at the opposite ends is assigned the two LEDs 30, and each of the central light guide plate blocks 51 is assigned the three LEDs 30. On the other hand, any light guide plate block 51 corresponding to the H-H line is assigned the three LEDs 30.

In other words, the same number of LEDs 30 is assigned to each of the light guide plate blocks 51 which are arranged along the short axis or the long axis of the light guide plate 50. On the other hand, for the light guide plate blocks 51 which are arranged along the long side or the short side of the light guide plate 50, the number of LEDs 30 assigned is greater in the central area of the long side or the short side than that in an end area of the long side or the short side. The light guide plate blocks 51 arranged along the long axis or the short axis of the light guide plate 50 described here include the light guide plate blocks 51 arranged on both sides of the long axis or the short axis.

In FIG. 9, the light guide plate block 51 corresponding to a corner of the screen is assigned a reduced number of LEDs 30. The reduction effect is less than the case in FIG. 8. However, the design in FIG. 9 much greater effective in reducing the component costs relating to the LED 30 and the power consumption as compared with the case when the present invention is not used.

The examples of the division of the light guide plate 50 have been described. The light guide plate 50 may be divided into any number, rather than the division numbers as illustrated in FIG. 7 or 8, in accordance with a screen size and the necessity of precision for controlling the screen. Regarding the arrangement of the LEDs 30, the examples of assigning two LEDs and three LEDs to the light guide plate block 51 have been described, but an LED or four or more LEDs may be assigned to the light guide plate block 51 as required.

Figure 10:
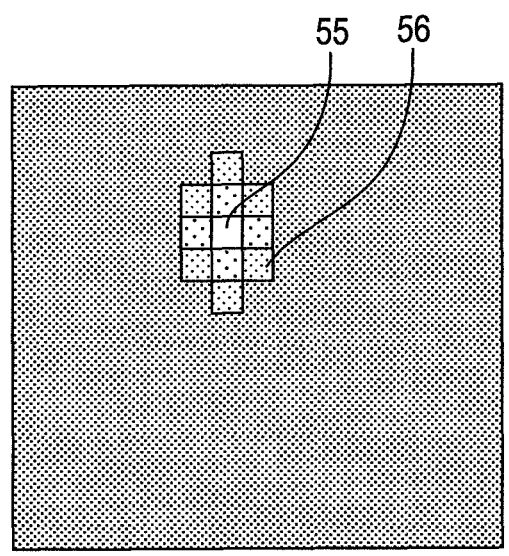
FIG. 10 is a plan view illustrating a light leak from a particular light guide plate block into an adjacent light guide plate block.

FIG. 10 shows an example of luminance when, in the light guide plate 50 divided into blocks, the LED/LEDs 30 assigned to a light guide plate block 55 alone is lit. As shown in FIG. 10, although a light guide plate block 55 alone is actually turned on, the light guide plate blocks 56 around the light guide plate block 55 are made bright. This is because the light leaks from the light guide plate block 55 into the other light guide plate blocks 56.

Because of such a light leak, a difference in luminance does not take place on the boundary between the light guide plate block 51 assigned the two LEDs 30 and the light guide plate block 51 assigned the three LEDs 30 as shown in FIGS. 7 to 9. Thus, even when a white image is displayed on the screen, non-uniformity of luminance does not occur.

In the present invention, since the brightness can be controlled for each light guide plate block 51, brightness area control can be achieved. The brightness area control refers to, for example, a control method for turning on the LED 30 corresponding to a bright portion of the screen and turning off the LED 30 corresponding to a dark portion.

Such area control is executed by storing video information in a frame memory, then discriminating a bright portion and a dark portion on the screen from each other, and then turning on the LEDs 30 located in an area corresponding to the bright portion. The execution of the brightness area control yields a reduction in power consumption and an improvement in contrast.

Figure 11A:
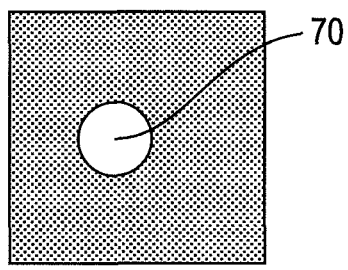
FIGS. 11A, 11B and 11C are plan views illustrating brightness area control.
Figure 11B:
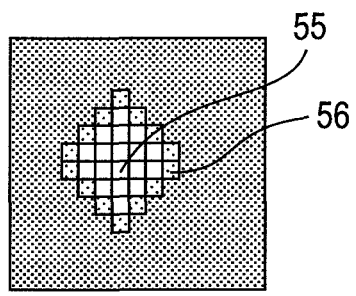
Figure 11C:
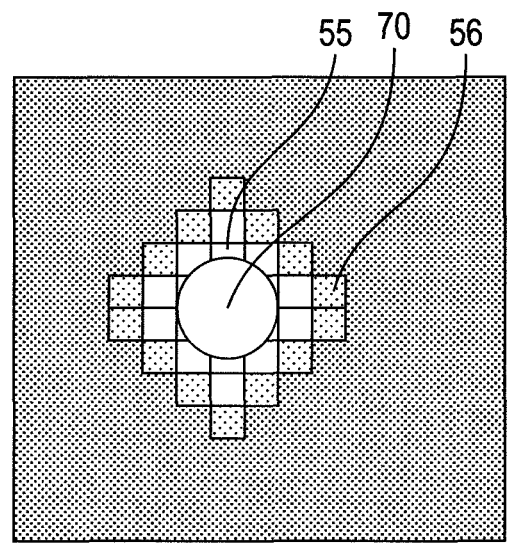

On the other hand, since the present invention employs the light guide plate blocks 51, the light guide plate blocks 51 and the precision of the brightness area control may possibly become a problem. FIGS. 11A, 11B and 11C are diagrams illustrating how the light guide plate blocks 51 affect an actual image when the brightness area control is performed. FIG. 11A shows an image desired to be actually displayed. FIG. 11A illustrates, for example, the case of displaying a bright portion 70, e.g., the moon, against the dark background.

FIG. 11B shows an example of luminance of the background when the bright area control is performed in accordance with the image in FIG. 11A. In FIG. 11B, the LEDs 30 assigned to the light guide plate blocks 51 corresponding to the moon on the screen are turned on. FIG. 11C shows the image in conjunction with the luminance of the backlight subjected to the brightness area control. The light guide plate blocks 51 corresponding to the moon on the screen are bright. As shown in FIG. 11C, the LEDs 30 assigned to the plural light guide plate blocks 51 are turned on in accordance with the bright portion, thus achieving appropriate luminance.

Exemplary Embodiment 2

Figure 12:
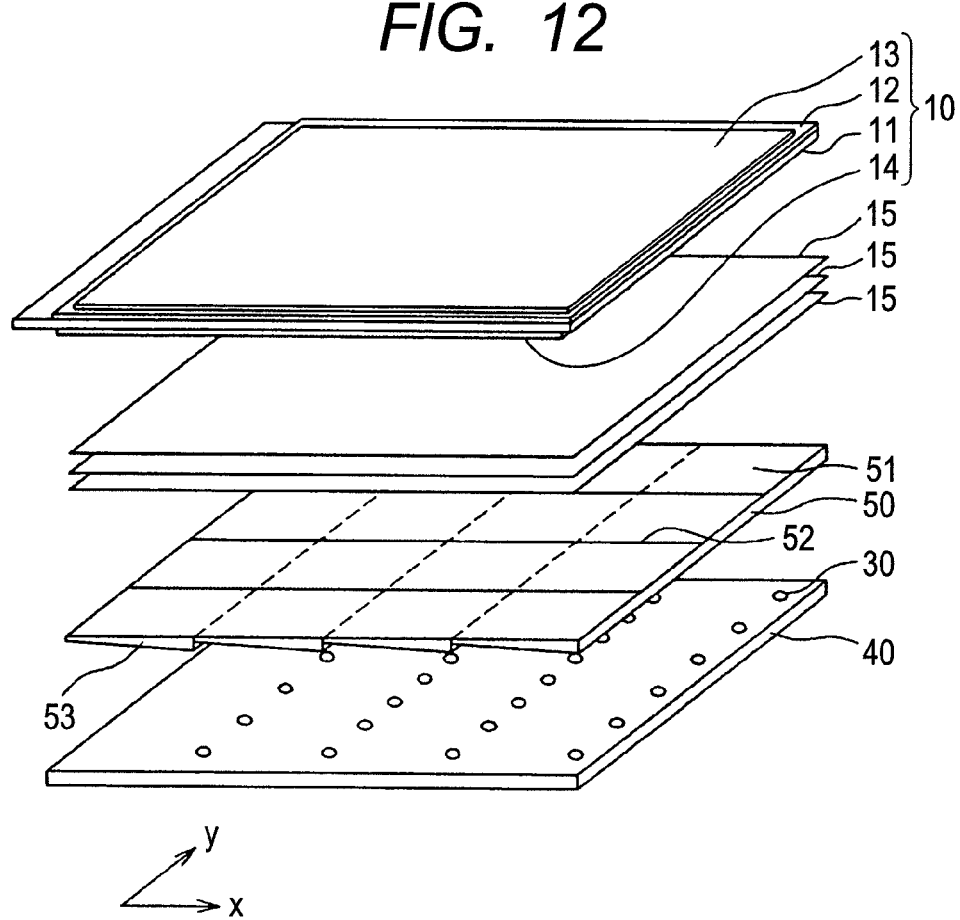
FIG. 12 is an exploded perspective view illustrating exemplary embodiment 2 according to the present invention.

In exemplary embodiment 1, the light guide plate 50 is formed by use of the divided light guide plates 53 having plural light guide plate blocks 51. On the other hand, all the light guide plate blocks 51 may be joined to form a single light guide plate 50. FIG. 12 is a perspective view of an LCD device when one light guide plate block 51 serves as a light guide plate 50. The LCD device shown in FIG. 12 is similar to the device in FIG. 2, except the light guide plate 50. In FIG. 12, the light guide plate 50 includes four light guide plate blocks 51 arranged in the y direction and the four light guide plate blocks 51 arranged in the x direction.

Figure 13:
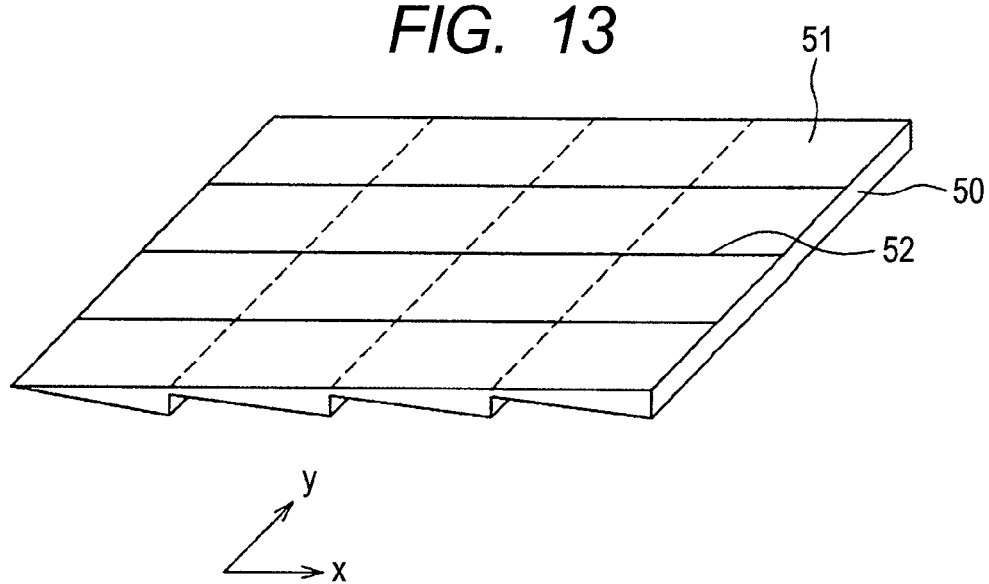
FIG. 13 is a perspective view illustrating a light guide plate according to exemplary embodiment 2.

FIG. 13 is a perspective view of the light guide plate 50 formed in one piece. In FIG. 13, a groove 52 extends in the x direction and represents a boundary between the light guide plate blocks 51. The shape of the groove 52 is the same as that shown in FIG. 3. The dotted line extending in the y direction in FIG. 13 corresponds to a portion having a reduced thickness in the light guide plate block 51. A boundary between the light guide plate blocks 51 is formed in the portion. Each of the light guide plate blocks 51 is formed in a wedge shape in cross-section, which has a thick end of approximate 3 mm in thickness and a thin end of 1 mm or less in thickness.

The boundaries between the light guide plate blocks 51 are formed by the grooves 52 extending in the x direction or areas extending in the y direction in which the light guide plate block 51 is reduced in thickness. In any boundary the light from a certain light guide plate block 51 is not completely blocked, so that the light of the certain light guide plate block 51 leaks into the light guide plate blocks 51 adjacent thereto. This act eliminates a luminance difference between the light guide plate blocks 51 to achieve smooth luminance distribution.

FIG. 14 is a cross-section view of assembly of the light guide plate 50 according to exemplary embodiment 2 and the wiring board 40 having the LEDs 30 mounted thereon. An optical sheet and the LCD panel 10 are mounted on the light guide plate 50 shown in FIG. 14, but they are omitted in FIG. 14. In FIG. 14, the LED 30 is placed on the face of the thick end of the light guide plate block 51 formed in a wedge shape in cross-section.

As shown in FIG. 14, the thin end of a wedge-shaped cross-section light guide plate block 51 is joined to the light guide plate block 51 located at the front thereof. Since this joining portion is provided, the light emitted from the LED 30 leaks into the light guide plate block 51 located at the front, thus preventing an acute change in luminance between the light guide plate blocks 51. As shown in FIG. 12, a number of LEDs 30 are mounted on the wiring board 40. All the light guide plate blocks 51 are formed in one piece. Accordingly, the light guide plate 50 and the LEDs 30 can be associated in one process.

Exemplary Embodiment 3

Exemplary embodiments 1 and 2 has described on the assumption that a reflective sheet 80 is provided on the bottom surface, i.e., the inclined surface, of the light guide plate block 51 as illustrated in FIG. 15. The reflective sheet 80, which is formed of a sheet having one surface coated with high reflectivity metal such as Al, reflects the light traveling downward from the light guide plate 50 toward the LCD panel 10.

In the case in FIG. 15, since the reflective sheet 80 is attached to the bottom surface of each of the light guide plate blocks 51, the number of man-hours needed to attach the reflective sheets 80 is large. After the light guide plate 50 has been formed, the reflective sheets 80 are affixed to the light guide plate 50 on a line-by-line basis. Since the reflective sheet 80 is affixed on an inclined surface of a recessed portion, the affixing mechanism is made complicated and the affixing accuracy is important.

As shown in FIG. 16, in the exemplary embodiment, the reflective sheet 80 is provided on the wiring board 40 mounted with the LEDs 30, instead of the light guide plate 50. The reflective sheet 80 shown in FIG. 16 is formed of a single sheet with holes formed corresponding to the LEDs 30. The reflective sheet 80 shown in FIG. 16 may be attached either before or after the LEDs 30 are mounted on the wiring board 40. In FIG. 16, the reflective sheet 80 is bonded to the wiring board 40 with an adhesive. According to exemplary embodiment 3, since the reflective sheet 80 is affixed is a flat surface, the affixing accuracy can be advantageously ensured.

Figure 17:
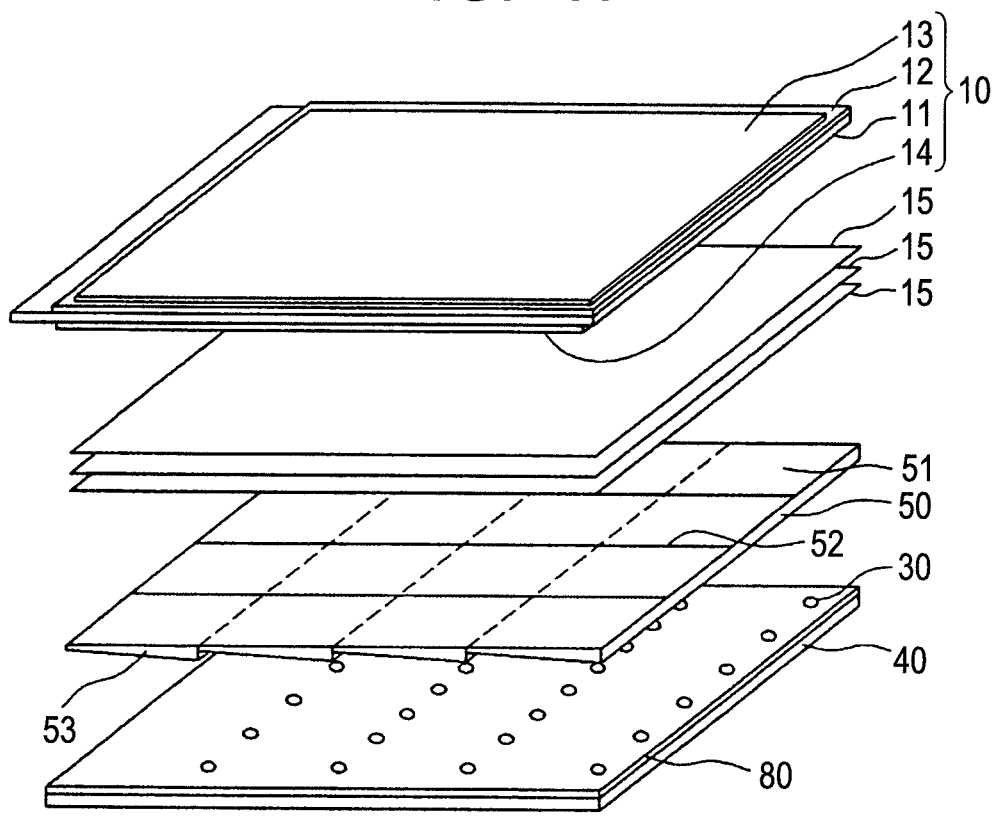
FIG. 17 is an exploded perspective view illustrating exemplary embodiment 3 according to the present invention.

FIG. 17 is an exploded perspective view of an LCD device employing the wiring board 40 with the reflective sheet 80 affixed thereto. In FIG. 17, a circuit region of the wiring board 40 is covered with the reflective sheet 80, but the LEDs 30 protrude from the holes formed in the reflective sheet 80 toward the light guide plate 50. The remaining structure in FIG. 17 is similar to that described in FIG. 2 or FIG. 12.

According to exemplary embodiment 3, as described above, since the reflective sheet 80 may be formed of a single sheet, a reduction in the number of man hours for the attaching process can be achieved. In addition, since the reflective sheet 80 is affixed to the flat surface, a complicated affixing mechanism is not necessary.

Exemplary Embodiment 4

Next, exemplary embodiment 4 according to the present invention will be described. In exemplary embodiments 1 to 3, the number of LEDs assigned to the light guide plate block located in the peripheral area is smaller than the number of LEDs assigned to the light guide plate block located in the central area. In exemplary embodiments 4 and later, a light guide plate block located in the peripheral area is greater in size (area) than that of a light guide plate block located in the central area. The light guide plate blocks located in the peripheral and central areas are assigned the same number of LEDs (three LEDs in the exemplary embodiment 4).

Figure 18:
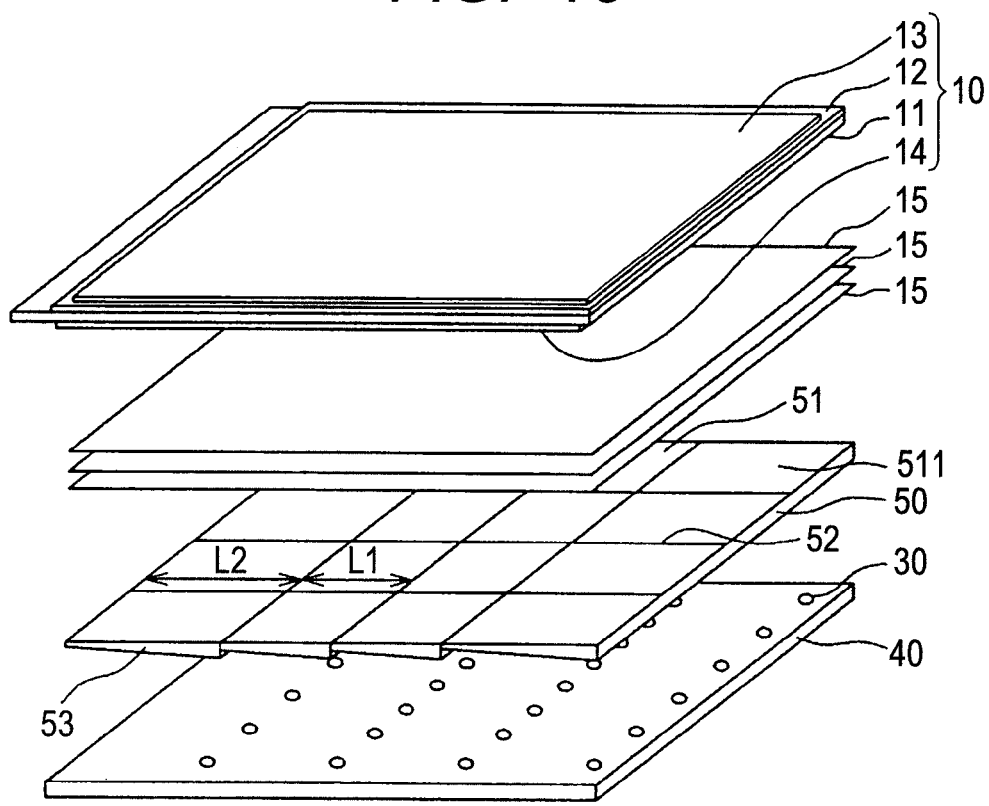
FIG. 18 is an exploded perspective view illustrating exemplary embodiment 4 according to the present invention.

FIG. 18 is a perspective exploded view illustrating the structure of the LCD device according to exemplary embodiment 4, in which the light guide plate 50 is made up of four rectangular divided light guide plates 53. Each of the divided light guide plates 53 located at the opposite ends of the light guide plate 50 (of the display surface of the LCD panel 10) has a length L2 longer than the length L1 of each of the two divided light guide plates located in the central area of the light guide plate 50 (of the display surface of the LCD panel 10). The length L2 of the end-located divided light guide plate 53 is 1.5 times longer than the length L1 of the center-located divided light guide plate. Hence, the use of the divided light guide plates 53 having a longer length located at the opposite ends of the light guide plate 50 reduces the total number of divided light guide plates 53 from five, required in a regular form, to four.

Figure 19:
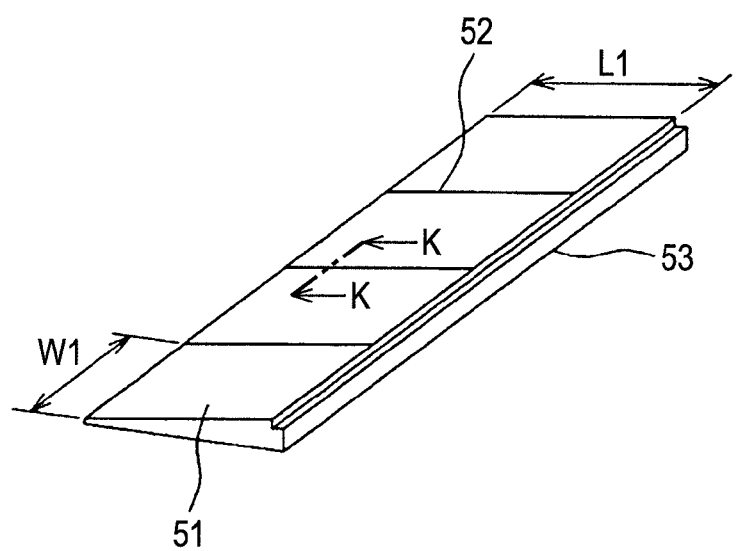
FIG. 19 is a perspective view of a divided light guide plate.

FIG. 19 shows the shape of the divided light guide plate 53. FIG. 19 is a perspective view of the center-located divided light guide plate 53 shown in FIG. 18. The center-located divided light guide plate and the end-located divided light guide plate have different lengths but are essentially identical in shape. The divided light guide plate 53 has four light guide plate blocks 51 formed therein. Each of the light guide plate blocks 51 has a length equal to the length L1 of the divided light guide plate 53, and a width W1. Accordingly, the divided light guide plate 53 has a width 4W1.

A cross-section view taken along the K-K line in FIG. 19 is the same as that shown in FIG. 3B, and the details are omitted.

Returning to FIG. 18, the same number of LEDs is assigned to each light guide plate block. As a result, the luminance in the opposite ends of the screen in FIG. 18 is lower than that in the center. However, in an application of the LCD device to a TV set or the like, if the luminance in the peripheral area is approximate 60% of the luminance in the central area, there is negligible visual difference on the screen from uniform luminance. As shown in FIG. 18, by reducing the width of the light guide plate block located in the peripheral area, the total number of light guide plate blocks is reduced. In addition, the LEDs assigned to any light guide plate block are constant in number. In consequence, a reduction in the total number of LEDs used in the LCD device is made possible, resulting in a reduction in power consumption of the LEDs.

The LCD panel 10 and the diffuser sheet 15 have been described in detail in exemplary embodiment 1, and a description of these elements is omitted in exemplary embodiment 4.

Figure 20:
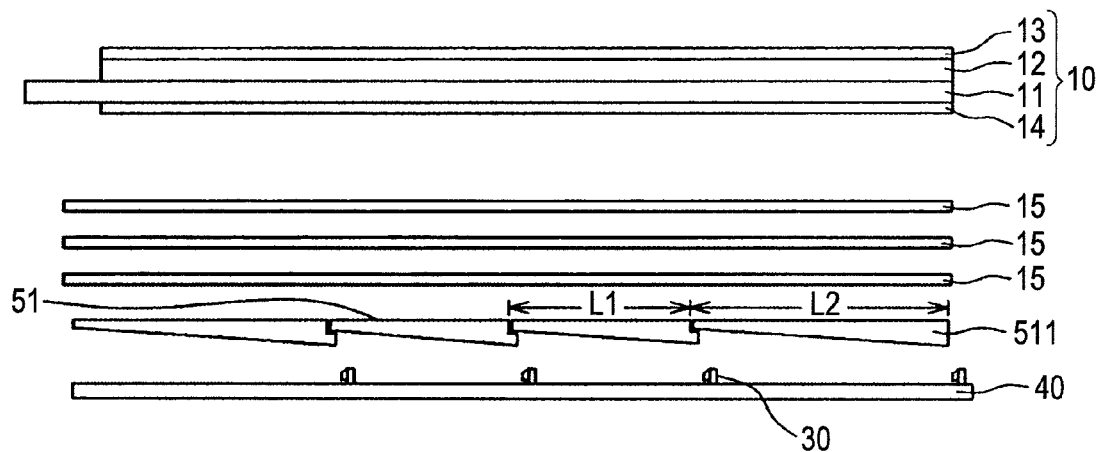
FIG. 20 is a cross-sectional exploded view illustrating exemplary embodiment 4.

FIG. 20 is a cross-sectional exploded view of the LCD device shown in FIG. 18. In FIG. 20, the LCD panel 10 and the three diffuser sheets 15 are structured as described in FIG. 2. In FIG. 20, the light guide plate 50 is disposed under the diffuser sheets 15. The light guide plate 50 is made up of the four divided light guide plates 53. Here, the length L2 of each of the end-located divided light guide plates is greater than the length L1 of each of the two center-located divided light guide plates.

As described in FIG. 19, each of the divided light guide plates 53 in turn includes the four light guide plate blocks. Each of the end-located divided light guide plates 53 includes light guide plate blocks 511 having a length L2, while each of the two center-located divided light guide plates includes light guide plate blocks 51 having a length L1. The length L2 of the light guide plate block 511 included in the end-located divided light guide plate 53 is 1.5 times greater than the length L1 of the light guide plate block 51 included in the center-located divided light guide plate 53. For this reason, the five divided light guide plates are required in a regular form, but the four divided light guide plates suffice. The shape, functions and the like of the divided light guide plate 53 are designed as described in exemplary embodiment 1, and the details are omitted.

In FIG. 20, the light guide plate 50 is placed on the wiring board 40 having the LEDs 30. The intervals at which the LEDs 30 are arranged are changed according to the length of the light guide plate block. The LEDs 30 are placed along the face of the thick end in a cross section of each divided light guide plate 53. The light emitted from the LED 30 enters the light guide plate 50 through the face of the thick end, and then exits after being redirected within the light guide plate 50 toward the LCD panel 10.

Figure 21A:
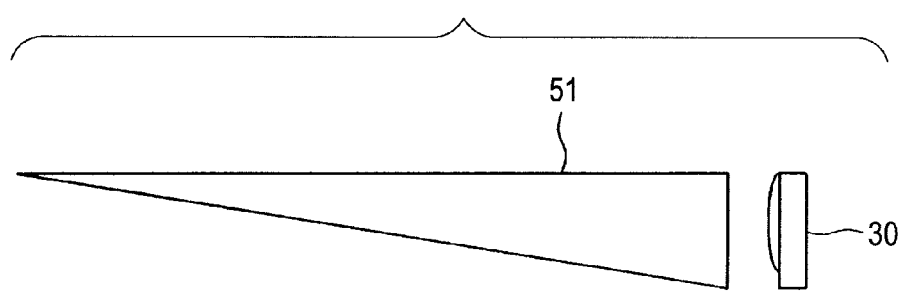
FIGS. 21A and 21B are schematic diagrams illustrating the relationship between a light guide plate block and LEDs.
Figure 21B:
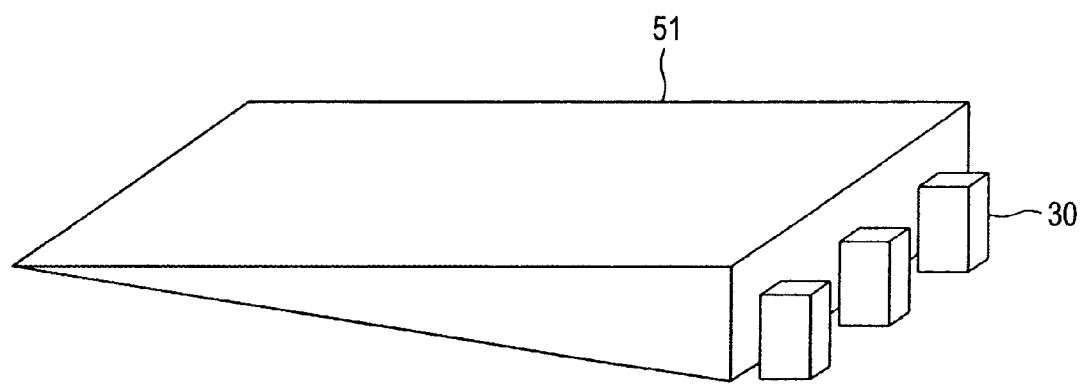

FIGS. 21A and 21B are diagrams illustrating the relationship between the light guide plate block 51 and the LEDs 30 according to exemplary embodiment 4. The relationship between the shape of the light guide plate block and the LEDs has been described in exemplary embodiment 1 (FIG. 6), but in exemplary embodiment 4 the three LEDs 30 are arranged along the end face of the light guide plate block 51 as shown in FIG. 21B. FIG. 21B shows the light guide plate block 51 located close to the center of the light guide plate 50 in FIG. 20, but the light guide plate block 511 located at the end of the light guide plate 50 shown in FIG. 18 is assigned the three LEDs 30.

Assuming that a ratio between the length L1 of the light guide plate block 51 located close to the center and the length L2 of the light guide plate block 511 located at the end in FIG. 20 is set to L2/L1=1.5, and the fixed number of LEDs, which are three LEDs, are assigned to each light guide plate block. The brightness in each of the opposite end area of the screen is approximately 1/1.5=67% of the brightness in the central area of the screen. However, since such a level of the difference in brightness is produced in a related art CRT TV set, a visual difference on the screen from uniform luminance is not produced. As described later, since light leaks from between the light guide plate blocks, an abrupt brightness change does not occur between the light guide plate blocks.

Figure 22:
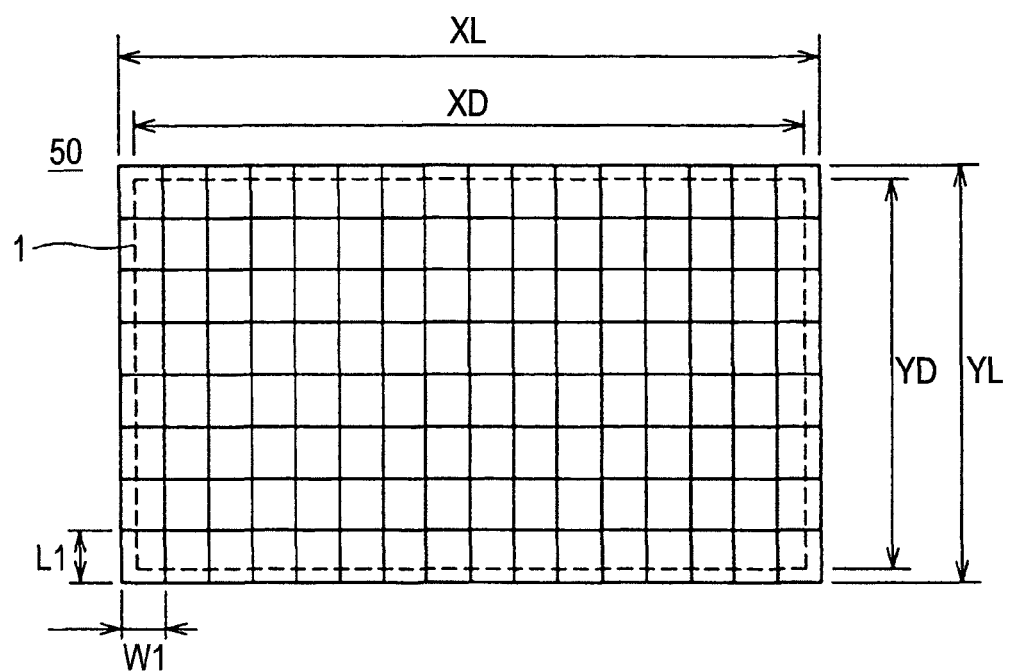
FIG. 22 shows a light guide plate of a comparative example of the present invention.

FIG. 22 shows a comparative example and is a plan view of a light guide plate 50 partitioned into light guide plate blocks 51 in a TV set with a 42-inch screen. In FIG. 22, the light guide plate block 51 is sized in a length L1 of 66 mm and a width W1 of 59 mm. The light guide plate is sized in a horizontal length XL of 944 mm and a vertical length YL of 528 mm. As a result, in the light guide plate in FIG. 22, the 128 light guide plate blocks in total are arrayed in a matrix with 16 rows and 8 columns. The light guide plate 50 includes 8 columns of the horizontally long divided light guide plates arranged in the vertical direction and each having 16 light guide plate blocks 51 which are arranged in the horizontal direction. However, a method of making the light guide plate 50 is not limited to the above-describe method. That is, a shape of the divided light guide plate may be arbitrarily selected. The following description is given basically of the light guide plate block.

In FIG. 22, the 42-inch screen has a horizontal length XD of 930 mm and a vertical length YD of 523 mm. Thus, the light guide plate has the horizontal length 14 mm longer and the vertical length 5 mm longer than those of the screen. The outside size of the light guide plate 50 is slightly larger than the screen size in consideration of accuracy required for combining the LCD panel 10, the light guide plate 50 and the LEDs 30, and the like.

As shown in FIG. 22, when the light guide plate blocks 51 of the same size are used and each of them is assigned the same number of LEDs 30, the luminance of the screen is uniform. However, the number of LEDs 30 assigned to the light guide plate blocks 51 corresponding to the peripheral area of the screen can be reduced, as a possible measure to reduce the luminance in the peripheral area for reducing the power consumption of the back light. In this case, the number of LEDs for each light guide plate block is different from one location to another on the screen.

Methods for driving an LCD device include an area control method of controlling the brightness of the backlight on a location-by-location basis in accordance with an image to be displayed on the screen. If the area control is performed, what is required is only to turn on the backlight or the LEDs corresponding to a necessary area. In consequence, a reduction in power consumption of the backlight and also an improvement in contrast can be achieved.

Such area control is executed by storing video information on one frame in a frame memory, then discriminating a bright portion and a dark portion on the screen from each other, and then turning on the LEDs 30 located only in an area corresponding to the bright portion. For the light guide plate partitioned into light guide plate blocks, the area control can be performed from one light guide plate block to another.

Figure 23:
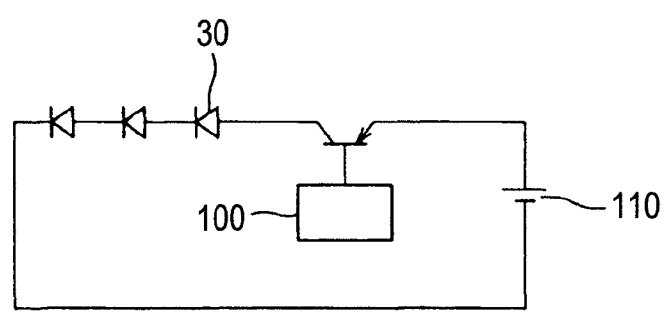
FIG. 23 is a circuit diagram illustrating a method for performing brightness area control on each light guide plate block.

FIG. 23 shows an example of a circuit of the LEDs 30 for each light guide plate block 51 for performing the area control. In the example in FIG. 23, the three LEDs 30 are assigned to a light guide plate block 51. In FIG. 23, a DC power supply 110 is used for the LEDs 30. The electric current passing through the LEDs 30 is controlled by a signal supplied from a control circuit 100. In this case, when the number of LEDs 30 assigned is different for each light guide plate block 51, a control signal needs to be changed in association with the number of LEDs 30, giving rise to a disadvantage of complicated area control system.

As illustrated in FIG. 18, FIG. 20 or exemplary embodiments described later, since the fixed number of LEDs 30 is assigned to each light guide plate block, the present invention additionally has an advantage of facilitating the area control. The following description is given of an example of applying exemplary embodiment 4 to a large-size TV set.

Figure 24:
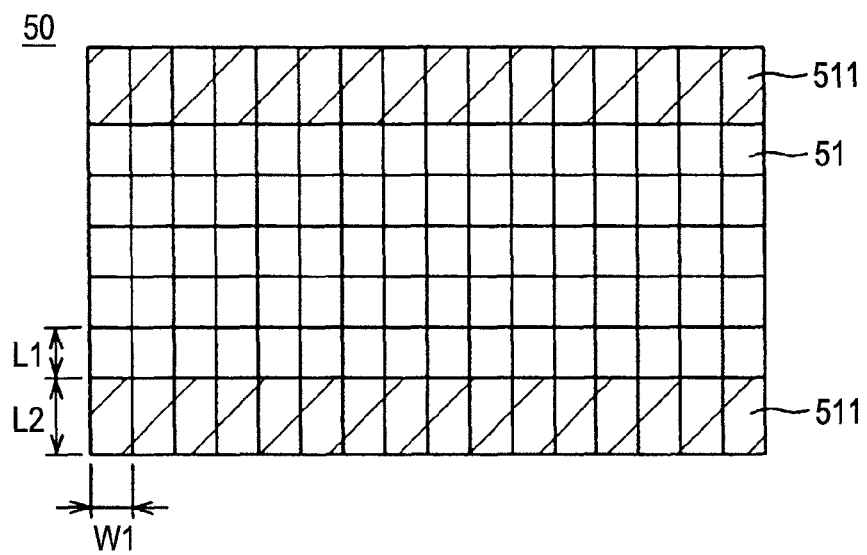
FIG. 24 is a plan view illustrating a light guide plate according to exemplary embodiment 4.

FIG. 24 shows an example of use of large-size light guide plate blocks placed corresponding to the upper and lower areas of the 42-inch TV screen to reduce the total number of light guide plate blocks. The hatching area in FIG. 24 is an area in which the large-size light guide plate blocks 511 is placed, which is the same in the drawings described later. In FIG. 24, the 112 light guide plate blocks are used and arrayed in 7 columns in the vertical direction and 16 rows in the horizontal direction. In this way, as compared with the case in FIG. 22, the number of light guide plate blocks is reduced by 16 and therefore the number of LEDs is reduced by 48. As a result, a reduction in costs for the LEDs 30 and a reduction in power consumption of the LEDs 30 can be achieved.

Figure 25:
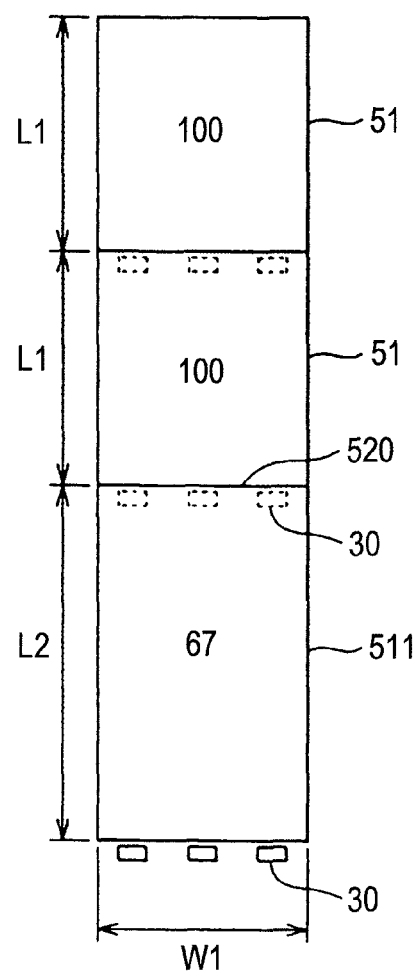
FIG. 25 is a partial enlarged plan view illustrating the light guide plate according to exemplary embodiment 4.

FIG. 25 shows an example of showing the lower three blocks in the light guide plate 50 in FIG. 24. Regarding the width of the light guide plate block, the regular light guide plate block 51 and the large-size light guide plate block 511 have the same width W1 of, for example, 59 mm. The large-size light guide plate block 511 has a length L2 of, for example, 99 mm, while the regular light guide plate block 51 has a length L1 of, for example, 66 mm.

The three LEDs 30 are assigned to any light guide plate block. Since the intensity of the light delivered from a light guide plate block is inversely proportional to the area of the light guide plate block, the luminance in the large-size light guide plate block is 67 when the luminance in the regular light guide plate block 51 is 100. However, since the light in a light guide plate block leaks from a boundary 520 between the regular light guide plate block 51 and the large-size light guide plate block 511, an abrupt luminance change does not occur in the boundary 520.

Figure 26:
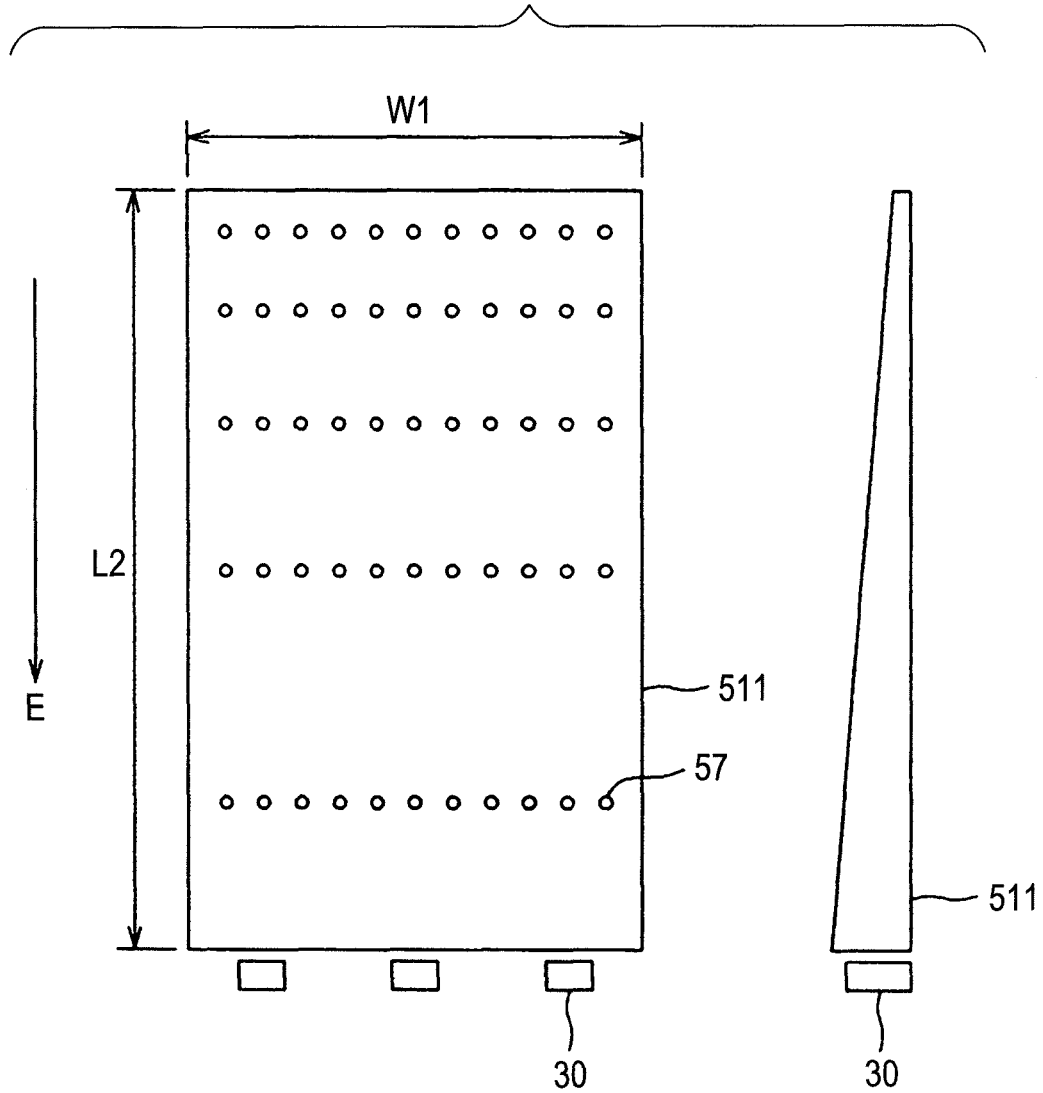
FIG. 26 is a schematic diagram of a large-size light guide plate block according to exemplary embodiment 4.

The luminance in the large-size light guide plate block 511 is approximately 33% lower than the luminance in the regular light guide plate block 51, but an abrupt luminance change does not occur in the boundary, so that a visual difference on the screen from uniform luminance is not produced. For further reducing the luminance difference, as illustrated in FIG. 26, grains 57 (or dots) are formed as light diffusing pattern on the large-size light guide plate block 511, and the density of the grains 57 may be changed.

The grains 57 are arranged on the rear surface of the light guide plate block 511, that is, on the side opposite to the LCD panel 10. A larger amount of light is delivered from a portion of the surface of the light guide plate block 511 in which the grains 57 are arranged at higher density. Accordingly, in FIG. 26, the light to be delivered from the light guide plate block 511 is reduced in amount as shown by the arrow E by being affected by the grain density. In this manner, the grain density is increased toward the regular light guide plate block 51, so that the luminance is gradually changed within the large-size light guide plate block 511 to make a change in luminance more unobservable.

As described in exemplary embodiment 1 (FIG. 10), in exemplary embodiment 4, the light leaks from a certain light guide plate block into other light guide plate blocks. Because of such a light leak, an abrupt change in screen luminance does not occur in an area in which the regular light guide plate block 51 is adjacent to the large-size light guide plate block 511 as shown in FIG. 24. Thus, even when a white image is displayed on the screen, non-uniformity of luminance does not occur.

In exemplary embodiment 4, an appropriate luminance for each light guide plate block can be provided by performing the area control as in the case of exemplary embodiment 1 (FIG. 11).

Exemplary Embodiment 5

Figure 27:
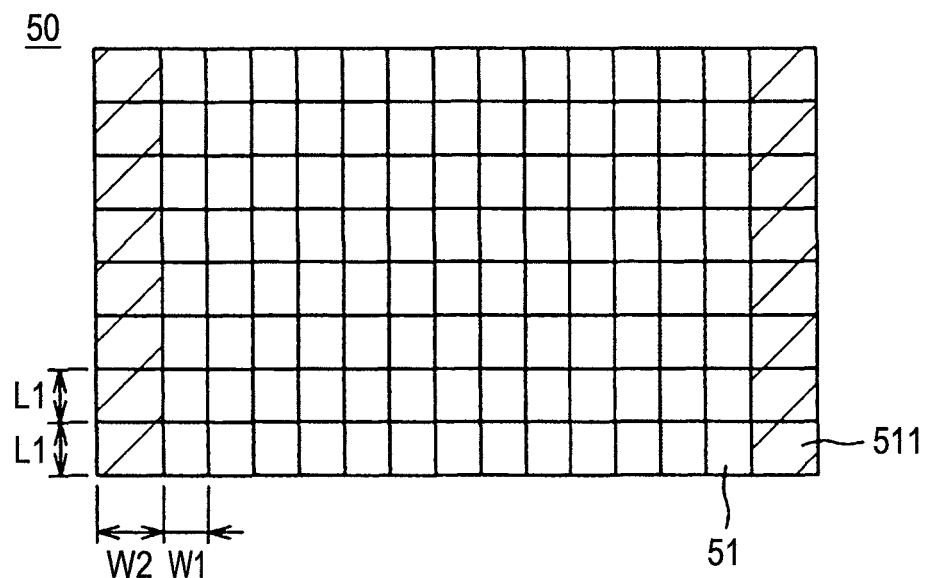
FIG. 27 is a plan view illustrating a light guide plate according to exemplary embodiment 5 of the present invention.

FIG. 27 shows an example of use of large-size light guide plate blocks placed corresponding to the right and left end areas of the 42-inch TV screen to reduce the total number of light guide plate blocks. In FIG. 27, the 120 light guide plate blocks are used and arrayed in 8 columns in the vertical direction and 15 rows in the horizontal direction. In this way, as compared with the case in FIG. 22, the number of light guide plate blocks is reduced by 8 and therefore the number of LEDs is reduced by 24. As a result, a reduction in costs for the LEDs 30 and a reduction in power consumption of the LEDs 30 can be achieved.

Figure 28:
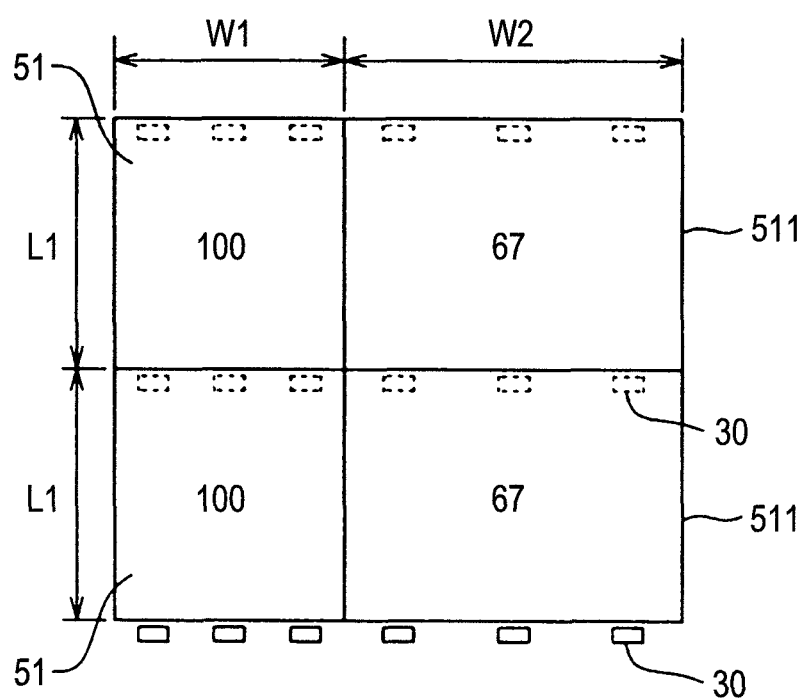
FIG. 28 is a partial enlarged plan view illustrating the light guide plate according to exemplary embodiment 5.

FIG. 28 shows an example of showing the lower right four blocks in the light guide plate 50 in FIG. 27. Regarding the length of the light guide plate block, the regular light guide plate block 51 and the large-size light guide plate block 511 have the same length L1 of, for example, 66 mm. The large-size light guide plate block 511 has a width W2 of, for example, 88.5 mm, while the regular light guide plate block 51 has a width W1 of, for example, 59 mm.

The three LEDs 30 are assigned to any light guide plate block. Since the intensity of the light delivered from a light guide plate block is inversely proportional to the area of the light guide plate block, the luminance in the large-size light guide plate block is 67 when the luminance in the regular light guide plate block 51 is 100. However, since the light in a light guide plate block leaks from a boundary 522 between the regular light guide plate block 51 and the large-size light guide plate block 511, an abrupt luminance change does not occur in the boundary 522.

Figure 29:
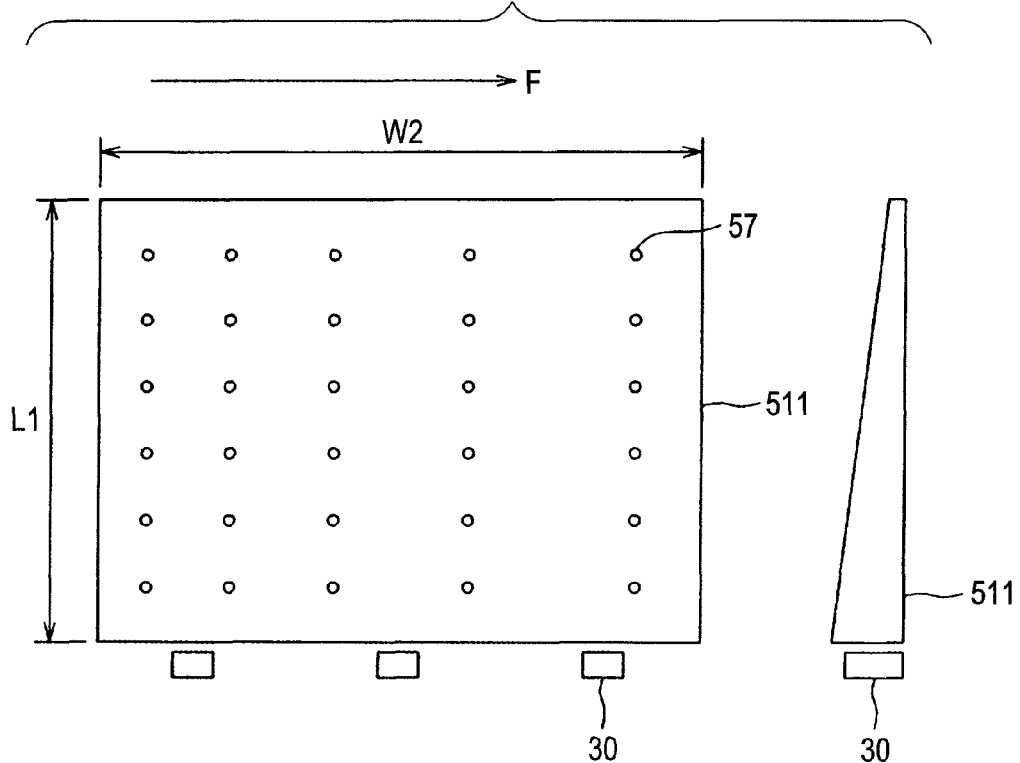
FIG. 29 is a schematic diagram of a large-size light guide plate block according to exemplary embodiment 5.

The luminance in the large-size light guide plate block 511 is approximately 33% lower than the luminance in the regular light guide plate block 51, but an abrupt luminance change does not occur in the boundary, so that a visual difference on the screen from uniform luminance is not produced. For further reducing the luminance difference, as illustrated in FIG. 29, grains 57 (or dots) are formed as light diffusing pattern on the large-size light guide plate block 511, and the density of the grains 57 may be changed.

The grains 57 are arranged on the rear surface of the light guide plate block 511, that is, on the side opposite to the LCD panel 10. A larger amount of light is delivered from a portion of the surface of the light guide plate block 511 in which the grains 57 are arranged at higher density. Accordingly, in FIG. 29, the light to be delivered from the light guide plate block 511 is reduced in amount as shown by the arrow F by being affected by the grain density. In this manner, the grain density is increased toward the regular light guide plate block 51, so that the luminance is gradually changed within the large-size light guide plate block 511 to make a change in luminance more unobservable.

Exemplary Embodiment 6

Figure 30:
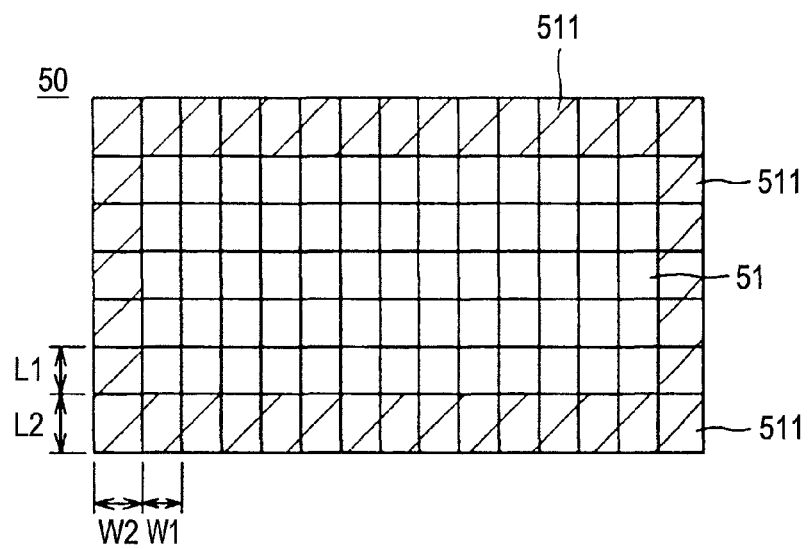
FIG. 30 is a plan view illustrating a light guide plate according to exemplary embodiment 6 of the present invention.

FIG. 30 shows an example of use of large-size light guide plate blocks 511 placed corresponding to the upper, lower, right and left end areas of the 42-inch TV screen to reduce the total number of light guide plate blocks. In FIG. 30, the 105 light guide plate blocks are used and arrayed in 7 columns in the vertical direction and 15 rows in the horizontal direction. In this way, as compared with the case in FIG. 22, the number of light guide plate blocks is reduced by 23 and therefore the number of LEDs is reduced by 69. As a result, a reduction in costs for the LEDs 30 and a reduction in power consumption of the LEDs 30 can be achieved.

The examples of luminance distribution in the boundary between the regular light guide plate block 51 and the large-size light guide plate block 511, uniformity of luminance distribution, and the like are the same as those described in exemplary embodiments 4 and 5. Exemplary embodiments 1 and 2 need the use of one type of the large-size light guide plate block 511 in addition to the regular light guide plate block 51 is required. Exemplary embodiment 6 needs the use of three types of the large-size light guide plate blocks 511 in addition to the regular light guide plate block 51.

That is, in FIG. 30, vertically-long light guide plate blocks 511 are used for the upper and lower areas of the screen, and horizontally-long light guide plate blocks 511 are used for the right and left side area of the screen. In addition, a light guide plate block 511 having a vertical length and a horizontal length greater than those of the regular light guide plate block 51 is required to be used for each corner of the screen. The light leaking into the large-size light guide plate block 511 for the corner leaks only from the large-size light guide plate blocks with low luminance in the upper (or lower) direction and the traverse direction. Thus, the luminance in the corner is further reduced.

In this manner, the vertical length L2 and the horizontal length W2 of the large-size light guide plate block 511 and the vertical length L1 and the horizontal length W1 of the regular light guide plate block 51 need to be determined to allow for a reduction in luminance in the corner.

Exemplary Embodiment 7

Exemplary Embodiments 4 to 6 has described the example of the arrangement of the light guide plate blocks such that the screen exhibits vertically or laterally symmetrical luminance distribution. However, there are various screen sizes in actual fact, and therefore the large-size light guide plate blocks cannot always be mounted for such a screen. That is, it is disadvantageous in terms of cost to design and manufacture light guide plate blocks for each screen size. For this reason, a light guide plate block designed and manufactured for a certain screen size may be required to be used as a light guide plate block for another screen size.

On the other hand, if a ratio of luminance of the regular light guide plate block to the large-size light guide plate block is approximate 40%, non-uniform luminance caused by the light guide plate blocks is hardly perceived. Exemplary embodiment 7 relates to examples of the large-size light guide plate blocks 511 placed in an asymmetrical form on the screen.

Figure 31:
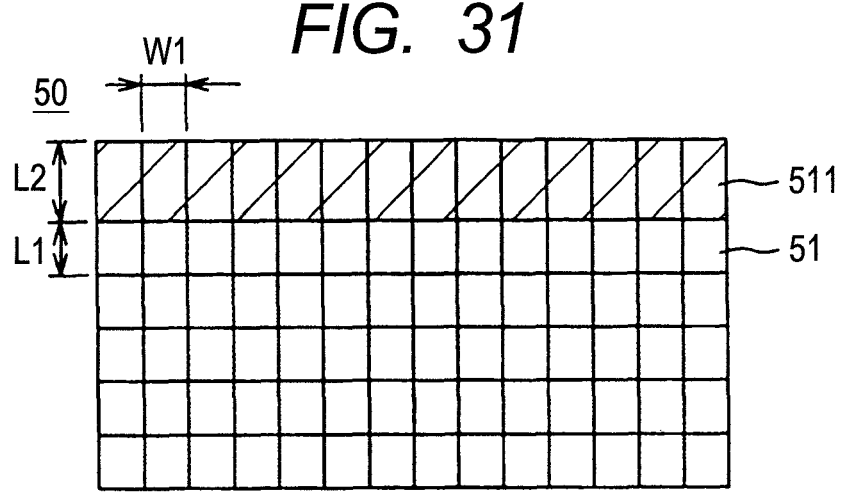
FIG. 31 is a plan view illustrating a first example of the light guide plate according to exemplary embodiment 7.

FIG. 31 shows an example of placing the large-size light guide plate blocks 511 along the upper end of the screen. In FIG. 31, the regular light guide plate block 51 and the large-size light guide plate block 511 have the same width W1. The length L2 of the large-size light guide plate block 511 is 1.5 times longer than the length L1 of the regular light guide plate block 51. In this case, the amount of light exiting from the large-size light guide plate block 511 is 67% of the amount of light exiting from the regular light guide plate block 51.

A change in luminance distribution is substantially unobservable until the length L2 of the large-size light guide plate block is approximately 1.67 times longer than the length L1 of the regular light guide plate block 51. In addition, for improving the luminance distribution, the density distribution of the grains formed on the bottom surface of the light guide plate block 511 as illustrated in FIG. 26 may be changed. In this way, a row of the light guide plate blocks can be omitted and the number of LEDs can be decreased by the number of corresponding LEDs.

Figure 32:
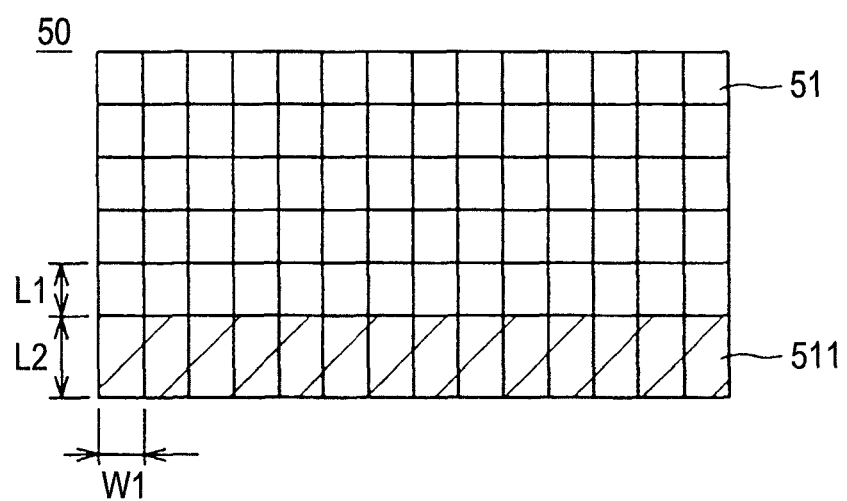
FIG. 32 is a plan view illustrating a second example of the light guide plate according to exemplary embodiment 7.

FIG. 32 shows an example of placing the large-size light guide plate blocks 511 along the lower end of the screen, which is an example of reducing the luminance in the lower side area of the screen. In this case, similarly to the example described in FIG. 31, the structure capable of making a change in luminance unobservable can be achieved. In this way, a row of the light guide plate blocks can be omitted and the number of LEDs can be decreased by the number of corresponding LEDs.

Figure 33:
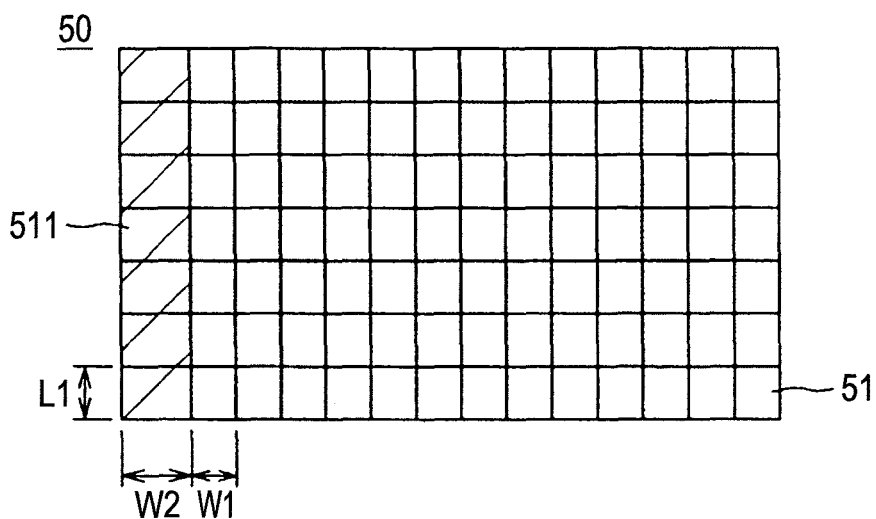
FIG. 33 is a plan view illustrating a third example of the light guide plate according to exemplary embodiment 7.
Figure 34:
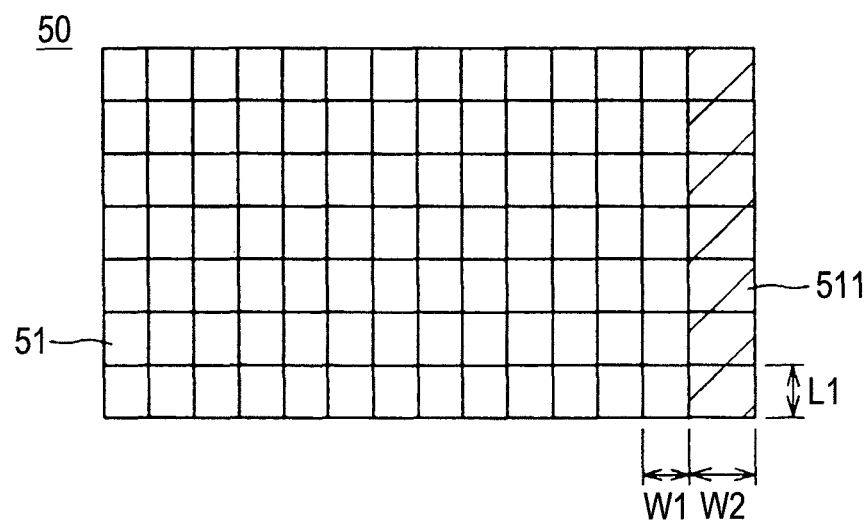
FIG. 34 is a plan view illustrating a fourth example of the light guide plate according to exemplary embodiment 7.

FIG. 33 shows an example of using the large-size light guide plate blocks 511 for the left side area of the screen. In FIG. 33, W2/W1 is set to 1.67 or the less, thereby making luminance distribution substantially unobservable. For making luminance distribution even less unobservable, for example, the grains 57 may be formed with density distribution as shown in FIG. 29 on the rear surface of the large-size light guide plate block 511. FIG. 34 shows an example of using the large-size light guide plate blocks 511 for the right side area of the screen. The operation is quite the same as that described in FIG. 33.

Figure 35:
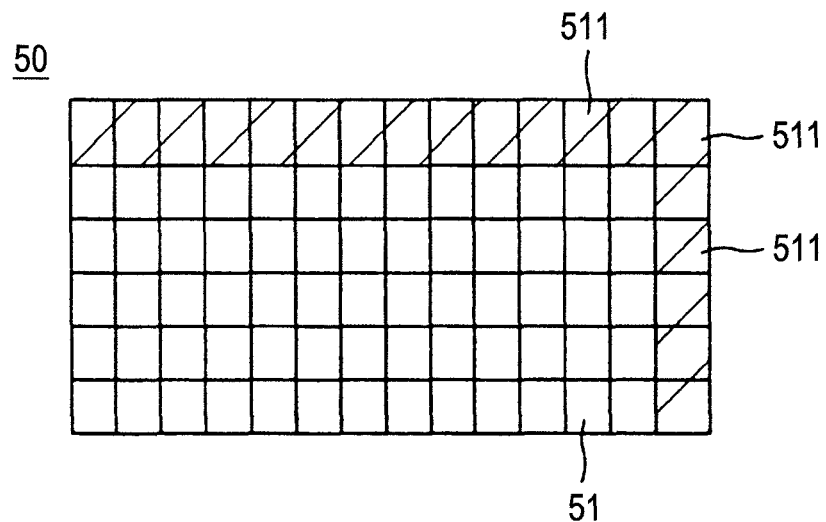
FIG. 35 is a plan view illustrating a fifth example of the light guide plate according to exemplary embodiment 7.

FIG. 35 shows an example of using the large-size light guide plate blocks 511 for the upper side area and the right side area of the screen. The examples described in FIG. 31 to FIG. 34 only require one type of large-size light guide plate block 511. However, exemplary embodiment 7 requires three types of large-size light guide plate blocks 511. However, when another large-size light guide plate block 511 for use in another screen size can be used, the arrangement of the light guide plate blocks as shown in FIG. 35 is advantages in some cases.

Figure 36:
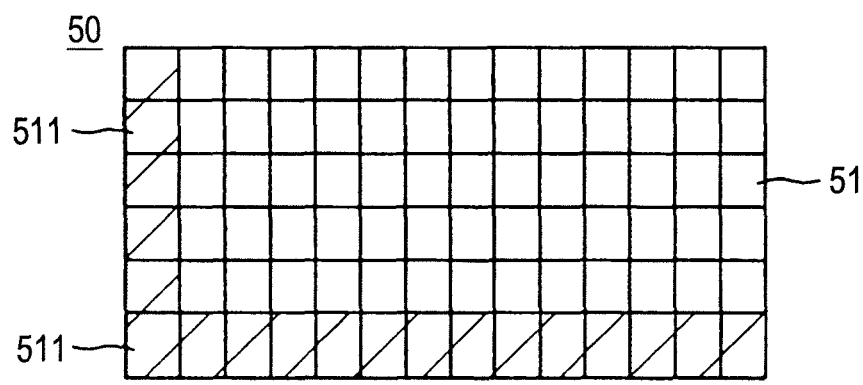
FIG. 36 is a plan view illustrating a sixth example of the light guide plate according to exemplary embodiment 7.

FIG. 36 shows an example of using the large-size light guide plate blocks 511 for the lower side area and the left side area of the screen. The large-size light guide plate blocks 511 can be used in quite the same manner as that described in FIG. 35. Moreover, it should be understood that it is possible to implement, in exactly the same manner, the use of the large-size light guide plate blocks 511 for the upper side area and the lower side area of the screen, and the use of the large-size light guide plate blocks 511 for the lower side area and the right side area of the screen.

Exemplary Embodiment 8

In exemplary embodiments 4 to 7, the light guide plate 50 is formed using the divided light guide plates 53 each having plural light guide plate blocks 51 or plural large-size light guide plate blocks 511. There are various modifications for the method of forming the divided light guide plate 53. For example, the example in FIG. 37 can use a combination of the divided light guide plates 53 each made up of a row of 16 large-size light guide plate blocks 511 in the horizontal direction and the divided light guide plates 53 each made up of a row of 16 regular light guide plate blocks 51 in the horizontal direction.

Figure 37:
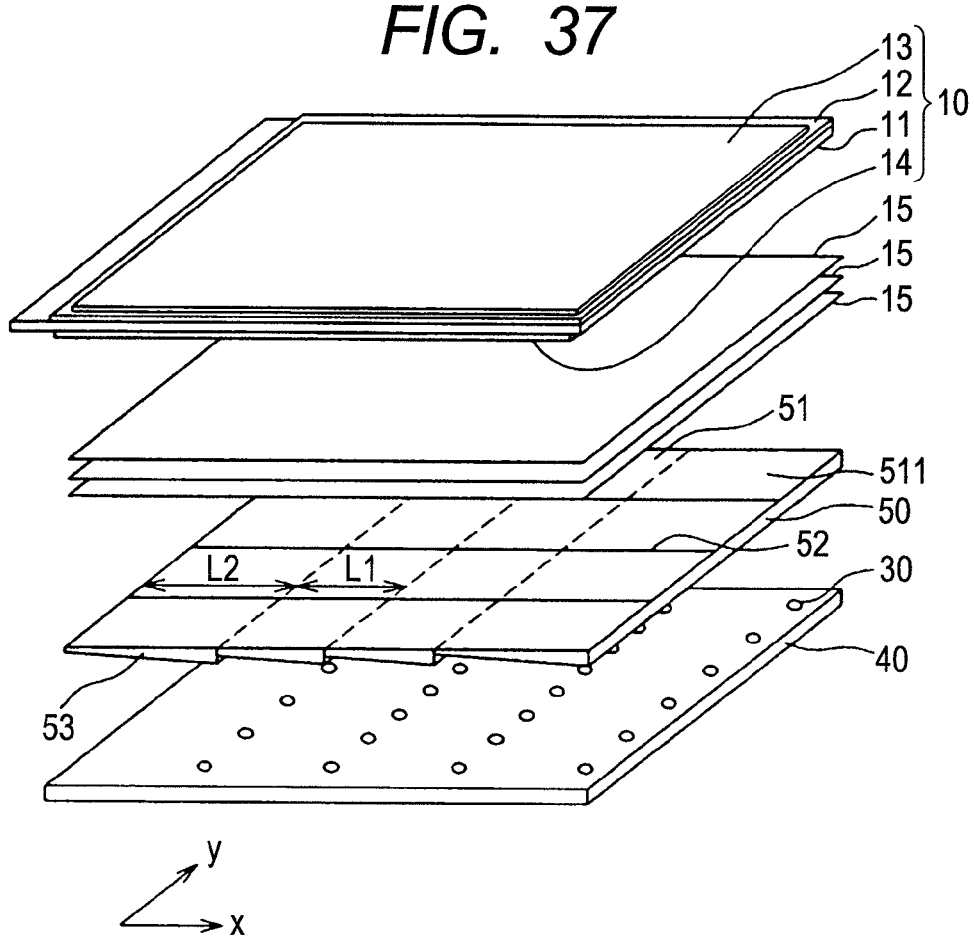
FIG. 37 is an exploded perspective view illustrating exemplary embodiment 8 according to the present invention.
Figure 38:
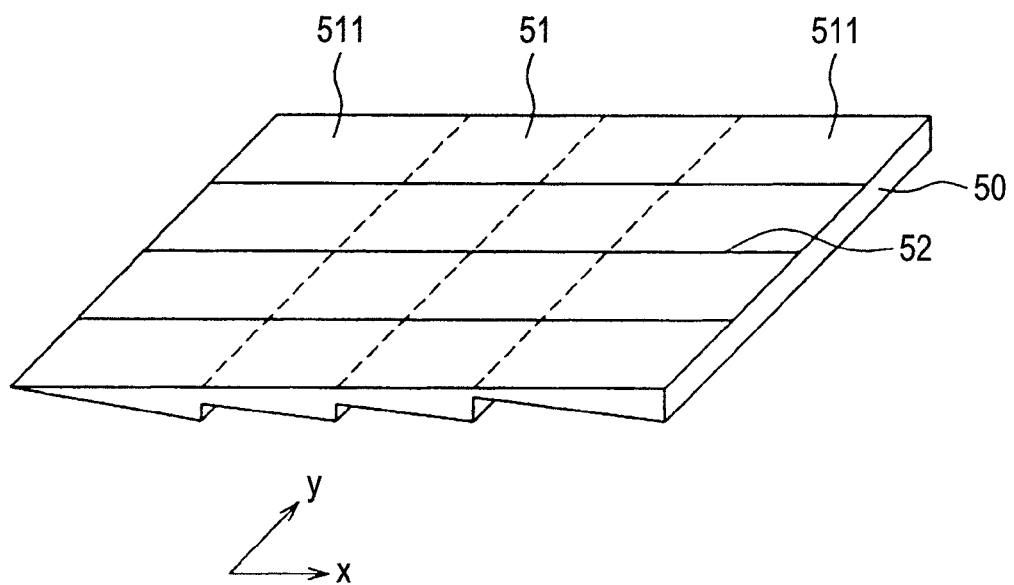
FIG. 38 is a perspective view of a light guide plate according to exemplary embodiment 8.
Figure 39:
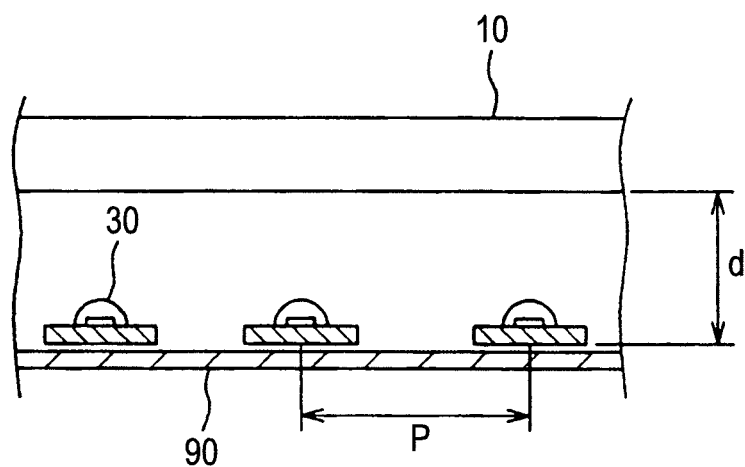
FIG. 39 is across-section view of a direct-lit backlight.
Figure 40:
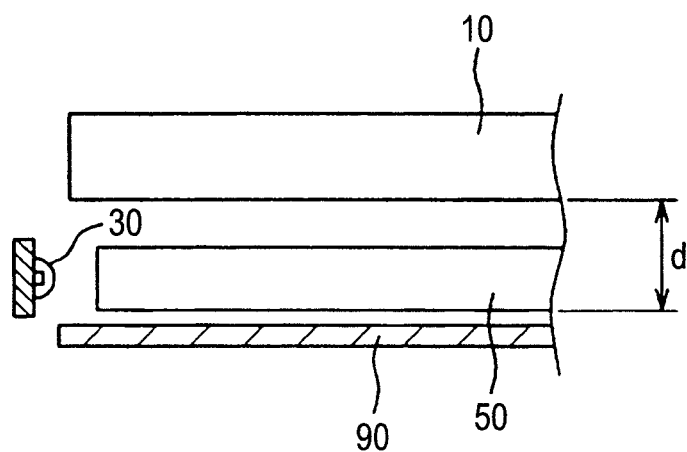
FIG. 40 is a cross-section view of an edge-lit backlight.

On the other hand, all the light guide plate blocks 51 or all the large-size light guide plate blocks 511 may be formed as a single light guide plate 50. FIG. 38 is an example of forming all the light guide plate blocks as a single light guide plate 50. FIG. 37 is the same as FIG. 18 except the light guide plate 50. In FIG. 37, the light guide plate 50 has four light guide blocks 51 formed therein in the y direction and four light guide blocks 51 formed therein in the x direction. The large-size light guide plate blocks 511 are formed in the columns at the opposite ends, while the regular light guide plate blocks 51 are formed in the central two columns.

FIG. 38 is perspective view of the light guide plate 50 formed in one piece. In FIG. 38, a groove 52 extends in the x direction and represents the boundary between the adjacent light guide plate blocks 51 or the large-size light guide plate blocks 511. The shape the groove 52 is the same as that shown in FIG. 3B. The dotted line extending in the y direction corresponds to a portion having a reduced thickness in the light guide plate block 51 or the large-size light guide plate block 511. A boundary between the light guide plate blocks 51 or the large-size light guide plate blocks 511 is formed in the portion. Each of the light guide plate blocks is formed in a wedge shape in cross-section, which has, for example, a thick end of approximate 3 mm in thickness and a thin end of less than 1 mm in thickness.

The boundaries between the light guide plate blocks are formed by the grooves 52 extending in the x direction or areas extending in the y direction in which the light guide plate block is reduced in thickness. In any boundary the light from a certain light guide plate block is not completely blocked, so that the light of the certain light guide plate block leaks into the light guide plate blocks adjacent thereto. This act eliminates a luminance difference between the light guide plate blocks to achieve smooth luminance distribution.

Assembly of the light guide plate 50 formed in one piece and the wiring board 40 having the LEDs 30 mounted thereon is the same as that in FIG. 14, and a description is omitted.

As described above, regarding the light guide plate having light guide plate blocks of different sizes, the divided light guide plate including plural light guide plate blocks may be constructed, or the light guide plate including plural light guide plate blocks may be formed in one piece.

What is claimed is:

1. A liquid crystal display device, comprising:
   a liquid crystal display panel; and
   a backlight including:
      a rectangular light guide plate that includes rectangular light guide plate blocks each arranged in a matrix form, and
      light sources arranged corresponding to the light guide plate blocks,
   wherein each of the light guide plate blocks receives light emitted from a corresponding light source of the light sources, and redirects the light toward the liquid crystal display panel,
   wherein at least one of the arrangement of light sources with respect to at least one of the light guide plate blocks and the respective light guide plate blocks are configured so that an intensity of light exiting a light guide plate block of the light guide plate blocks located in a central area of the light guide plate is higher than an intensity of light exiting a light guide plate block of the light guide plate blocks located in a peripheral area of the light guide plate.

2. The liquid crystal display device according to claim 1, wherein the light sources include LEDs, and
   the number of LEDs assigned to the light guide plate block located in the central area of the light guide plate is greater than the number of LEDs assigned to the light guide plate block located in the peripheral area of the light guide plate to cause the intensity of the light exiting the light guide plate block located in the central area of the light guide plate to exceed the intensity of the light exiting the light guide plate block located in the peripheral area of the light guide plate.

3. The liquid crystal display device according to claim 1, wherein the light guide plate block located in the central area of the light guide plate has an area smaller than an area of the light guide plate block located in the peripheral area of the light guide plate to cause the intensity of the light exiting the light guide plate block located in the central area of the light guide plate to exceed the intensity of the light exiting the light guide plate block located in the peripheral area of the light guide plate.

4. A liquid crystal display device, comprising:
   a liquid crystal display panel; and
   a backlight including:
      a rectangular light guide plate includes rectangular light guide plate blocks each arranged in a matrix form, and
      LEDs arranged corresponding to the light guide plate blocks,
   wherein the number of LEDs assigned to light guide plate blocks of the light guide plate blocks located in a central area of the light guide plate is greater than the number of LEDs assigned to light guide plate blocks of the light guide plate blocks located in a peripheral area of the light guide plate.

5. The liquid crystal display device according to claim 4, wherein the light guide plate is made up of a plurality of divided light guide plates each including a plurality of the light guide plate blocks.

6. The liquid crystal display device according to claim 4, wherein the light guide plate including the light guide plate blocks arranged in a matrix form is formed in one piece.

7. The liquid crystal display device according to claim 4, wherein the LEDs are mounted on a wiring board, and a reflective sheet is provided integrally on the wiring board.

8. The liquid crystal display device according to claim 4,
   wherein the number of LEDs corresponding to the light guide plate blocks arranged along a short axis and a long axis passing through a center of the light guide plate is greater around a center of the short axis and a center of the long axis than the number of LEDs around an end of the short axis and an end of the long axis, and
   the number of LEDs corresponding to the light guide plate blocks arranged along a short side of a periphery of the light guide plate is equal to the number of LEDs corresponding to the light guide plate blocks arranged along a long side of the periphery of the light guide plate.

9. The liquid crystal display device according to claim 4, wherein the number of LEDs assigned to each of the light guide plate blocks located in the central area of the light guide plate is greater than the number of LEDs assigned to each of the light guide plate blocks located in four corners of the light guide plate.

10. The liquid crystal display device according to claim 4,
    wherein the number of LEDs corresponding to the light guide plate blocks arranged along a short side and a long side of a periphery of the light guide plate is greater around a center of the short side and a center of the long side than that around an end of the short side and an end of the long side, and
    the number of LEDs assigned to the light guide plate blocks arranged along a short axis passing through a center of the light guide plate is equal to the number of LEDs assigned to the light guide plate blocks arranged along a long axis passing through the center of the light guide plate.

11. A liquid crystal display device, comprising:
a liquid crystal display panel; and
a backlight including:
   a rectangular light guide plate that includes rectangular light guide plate blocks each arranged in a matrix form, and
   LEDs arranged corresponding to the light guide plate blocks,
wherein each of light guide blocks of the light guide plate blocks located in an end area of the light guide plate has a size greater than a size of each of light guide plate blocks of the light guide plate blocks located in a central area of the light guide plate.

12. The liquid crystal display device according to claim 11, wherein the size of the light guide plate block located in the end area of the light guide plate in a horizontal direction is greater than the size of the light guide plate block located in the central area of the light guide plate.

13. The liquid crystal display device according to claim 11, wherein the size of the light guide plate block located in the end area of the light guide plate in a vertical direction is greater than the size of the light guide plate block located in the central area of the light guide plate.

14. The liquid crystal display device according to claim 11, wherein large-size light guide plate blocks are arranged in the end area of the light guide plate, each of the large-size light guide plate blocks having a size and an area greater than the size and an area of the light guide plate block located in the central area of the light guide plate, wherein the number of LEDs assigned to the light guide plate block is equal to the number of LEDs assigned to the large-size light guide plate block.

15. A liquid crystal display device comprising:
a liquid crystal display panel; and
a backlight including:
   a rectangular light guide plate that includes rectangular light guide plate blocks each arranged in a matrix form, and
   LEDs arranged corresponding to the light guide plate blocks,
wherein each of light guide blocks of the light guide plate blocks located in an end area of the light guide plate has a size greater than a size of each of light guide plate blocks of the light guide plate blocks located in a central area of the light guide plate; and
wherein, when the area of the light guide plate block in the central area is S1 and the area of the large-size light guide plate block is S2, S2/S1 is greater than 1 and equal to or less than 1.67.

16. A liquid crystal display device comprising:
a liquid crystal display panel; and
a backlight including:
   a rectangular light guide plate that includes rectangular light guide plate blocks each arranged in a matrix form, and
   LEDs arranged corresponding to the light guide plate blocks,
wherein each of light guide blocks of the light guide plate blocks located in an end area of the light guide plate has a size greater than a size of each of light guide plate blocks of the light guide plate blocks located in a central area of the light guide plate, and
wherein electric power applied to a plurality of the LEDs assigned to the light guide plate block in the central area is equal to electric power applied to a plurality of the LEDs assigned to the large-size light guide plate block.

17. The liquid crystal display device according to claim 14, wherein a size and an area of the light guide plate blocks at each of the right and left ends in the horizontal direction of the light guide plate is larger than a size and an area of the light guide plate at the central area of the light guide plate.

18. The liquid crystal display device according to claim 14, wherein a size and an area of the light guide plate blocks at each of the upper and lower ends in the vertical direction of the light guide plate is larger than a size and an area of the light guide plate at the central area of the light guide plate.

* * * * *